(12) United States Patent
Radhakrishnan et al.

(10) Patent No.: US 8,351,643 B2
(45) Date of Patent: Jan. 8, 2013

(54) MEDIA FINGERPRINTS THAT RELIABLY CORRESPOND TO MEDIA CONTENT

(75) Inventors: Regunathan Radhakrishnan, San Bruno, CA (US); Claus Bauer, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 280 days.

(21) Appl. No.: 12/681,598

(22) PCT Filed: Oct. 6, 2008

(86) PCT No.: PCT/US2008/078975
§ 371 (c)(1), (2), (4) Date: Oct. 21, 2010

(87) PCT Pub. No.: WO2009/046438
PCT Pub. Date: Apr. 9, 2009

(65) Prior Publication Data
US 2011/0026761 A1 Feb. 3, 2011

(51) Int. Cl.
*G06K 9/00* (2006.01)
(52) U.S. Cl. .................. 382/100; 382/124; 348/E5.067
(58) Field of Classification Search .................. 382/100, 382/124, 125, 151, 174, 190, 195, 201, 206, 382/216, 276, 293, 295, 296; 709/231, 203, 709/217, 236, 229, 230, 219, 218; 715/202, 715/723, 255, 719, 717, 726, 967, 201, 203, 715/243, 751, 716, 205; 707/E17.028, 999.107, 707/E17.009, E17.013, 961, 999.102, E17.026, 707/999.2, 999.104, 999.1; 375/E7.129, 375/E7.176, E7.006, E7.211, E7.004, E7.016, 375/E7.134, E7.159, E7.172, E7.181, E7.186, 375/E7.199, E7.216, E7.254, E7.007, E7.135; 348/E7.073, E5.067, E5.008, E5.105
See application file for complete search history.

(56) References Cited

U.S. PATENT DOCUMENTS
5,870,754 A * 2/1999 Dimitrova et al. .................... 1/1
(Continued)

FOREIGN PATENT DOCUMENTS
WO WO 2005/122589 A1 12/2005

OTHER PUBLICATIONS
Sung-Hee Lee et al. "Weighted-Adaptive Motion-Compensated Frame Rate Up-Conversion", IEEE Transactions on Consumer Electronics, vol. 49, No. 3, Aug. 2003, pp. 485-492.
(Continued)

*Primary Examiner* — Sheela Chawan
(74) *Attorney, Agent, or Firm* — Hickman Palermo Truong Becker Bingham Wong LLP; Kirk D. Wong

(57) ABSTRACT

Quantized energy values are accessed to initially represent a temporally related group of content elements in a media sequence. The values are accessed over a matrix of regions into which the initial representation is partitioned. The initial representation may be downsampled and/or cropped from the content. A basis vector set is estimated in a dimensional space from the values. The initial representation is transformed into a subsequent representation, which is in another dimensional space. The subsequent representation projects the initial representation, based on the basis vectors. The subsequent representation reliably corresponds to the media content portion over a change in a geometric orientation thereof. Repeated for other media content portions of the group, subsequent representations of the first and other portions are averaged or transformed over time. The averaged/transformed values reliably correspond to the content portion over speed changes. The initial representation may include spatial or transform related information.

69 Claims, 8 Drawing Sheets

U.S. PATENT DOCUMENTS

| | | |
|---|---|---|
| 6,112,181 A | 8/2000 | Shear et al. |
| 6,751,354 B2 | 6/2004 | Foote et al. |
| 6,915,009 B2 | 7/2005 | Foote et al. |
| 6,968,337 B2 | 11/2005 | Wold |
| 7,013,301 B2 | 3/2006 | Holm et al. |
| 7,054,792 B2 | 5/2006 | Frei et al. |
| 7,065,416 B2 | 6/2006 | Weare et al. |
| 7,082,394 B2 | 7/2006 | Burges et al. |
| 7,092,914 B1 | 8/2006 | Shear et al. |
| 7,242,810 B2 | 7/2007 | Chang |
| 7,500,007 B2 * | 3/2009 | Ikezoye et al. ............... 709/231 |
| 7,809,154 B2 * | 10/2010 | Lienhart et al. ............... 382/100 |
| 2003/0086341 A1 | 5/2003 | Wells et al. |
| 2004/0240562 A1 * | 12/2004 | Bargeron et al. ........ 375/240.29 |
| 2005/0065976 A1 | 3/2005 | Holm et al. |
| 2005/0091275 A1 | 4/2005 | Burges et al. |
| 2006/0064299 A1 | 3/2006 | Uhle et al. |
| 2006/0106867 A1 | 5/2006 | Burges et al. |
| 2006/0111801 A1 | 5/2006 | Weare et al. |
| 2006/0190450 A1 | 8/2006 | Holm et al. |

OTHER PUBLICATIONS

Jelena Kovacevic et al. "Deinterlacing by Successive Approximation", IEEE Transactions on Image Processing, vol. 6, No. 2, Feb. 1997, pp. 339-344.

* cited by examiner

MEDIA FINGERPRINTS THAT RELIABLY CORRESPOND TO MEDIA CONTENT

CROSS-REFERENCE TO RELATED APPLICATIONS

Benefit Claim

This application claims benefit as a 371 of PCT/US2008/078975, filed Oct. 6, 2008, which claims priority to PCT/US2008/00588, filed May 1, 2008 and also claims priority to U.S. Provisional Application No. 60/997,943 filed Oct. 5, 2007 and U.S. Provisional Application No. 61/098,563, filed Sep. 19 2008.

TECHNOLOGY

The present invention relates generally to media. More specifically, embodiments of the present invention relate to media fingerprints that reliably correspond to media content.

BACKGROUND

Media content is information that is embodied, stored, transmitted, received, processed, and used with at least one medium. For instance, audio information content is associated with audio media and video information content is associated with video media. A video medium may have associated audio information content, as well as video information content and may thus, at least sometimes, be considered an example of audio/visual (AV) media or so-called multimedia, mixed media, combined media and the like. As used herein, the terms "media content," "information content," and "content" may be used interchangeably.

Media content may be associated with a corresponding representation. Some representations of media content may be derived (e.g., computed, extracted) from information within, or which comprises a part of the media content. A media fingerprint embodies or captures an essence of the information content of the corresponding media and may be uniquely identified therewith. A media fingerprint, sometimes referred to as a media signature or a stream of media signatures, is an example of a media content representation. Video fingerprints are media fingerprints that may be derived from video media content. Audio (acoustic) fingerprints are media fingerprints that may be derived from audio media content (including audio media content within video media). As used herein, the term media fingerprint may refer to a low bit rate representation of the media content with which they are associated and from which they are derived.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
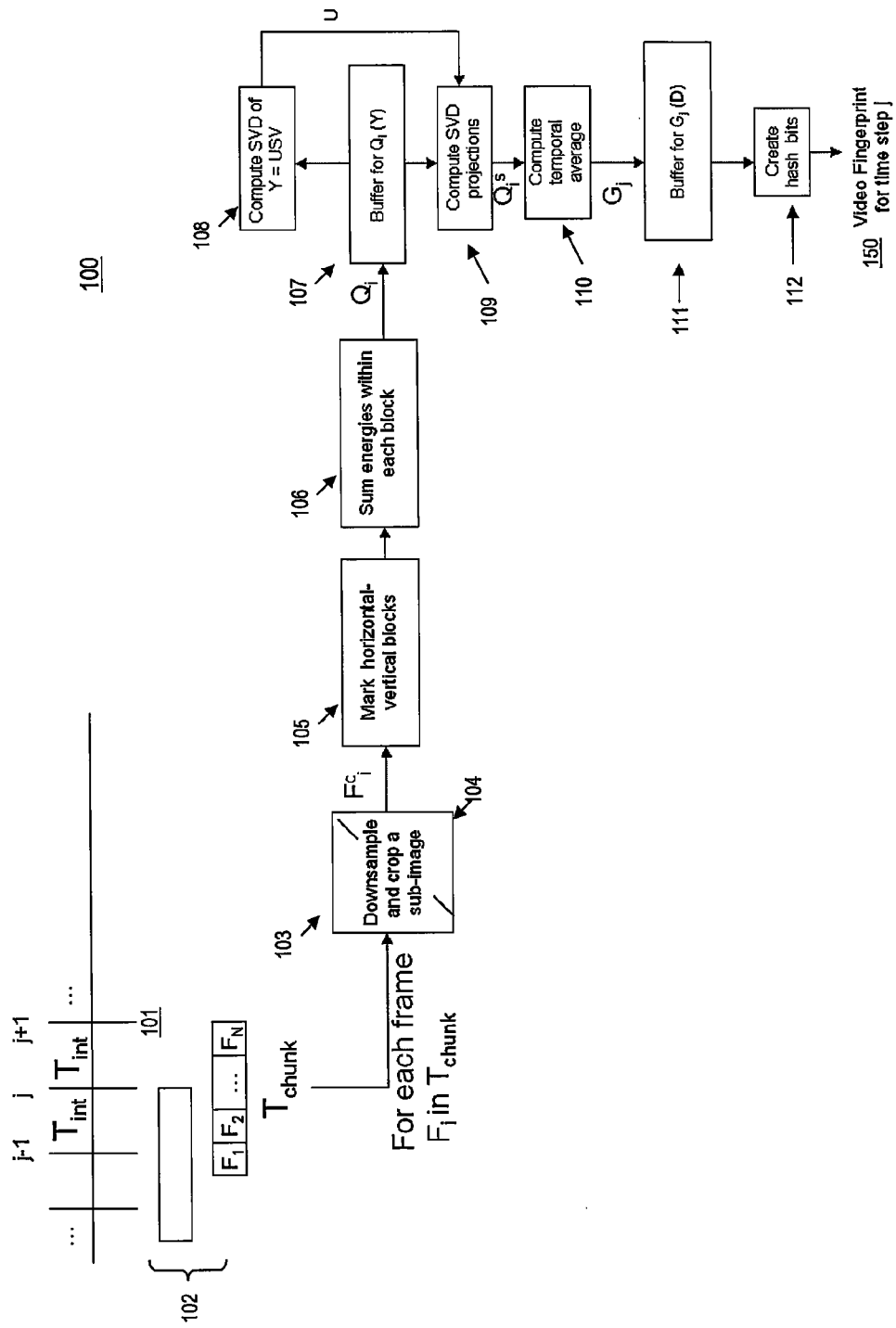
FIG. 1 depicts a first example procedure, according to an embodiment of the present invention.

Example embodiments, which relate to media fingerprints that reliably correspond to media content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments of the present invention are described, which relate to media fingerprints that reliably correspond to media content. Media fingerprints may be described herein with reference to one or more example media, including video, graphical, and audiovisual and other multimedia. The selection of an example medium in this description may be made for simplicity and concise unity and, unless expressly stated to the contrary, should not be construed as limiting an embodiment to a particular medium. Embodiments of the present invention are well suited to function with video, audiovisual and other multimedia, graphical and other media. Furthermore, embodiments of the present invention are well suited to function with video media that displays video and graphical information that may be oriented in two or three spatial dimensions.

Overview of an Example Embodiment

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

For an initial representation of a portion of media content of a temporally related group of content portions in a sequence of media content, pixel values, such as quantized energy values, are accessed for content elements. The quantized energy values or other pixel values are accessed over a matrix of regions into which the initial representation is partitioned. The initial representation is downsampled to a lower resolution and cropped from the media content portion. A set of basis vectors is estimated in a first dimensional space from the quantized energy values or other pixel values. The initial representation is transformed into a subsequent representation of the media content portion. The subsequent representation is in a second dimensional space. The subsequent representation comprises a projection of the initial representation, based on the estimated basis vectors. The subsequent representation may reliably correspond to the media content portion over an arbitrary change in a geometric orientation thereof. The initial representation may include spatial or information related to a transform function over spatially distributed information. Embodiments may function with transform functions that include, but are not limited to, the discrete cosine transform (DCT), modified discrete cosine transform (MDCT or mDCT), discrete Fourier transform (DFT), fast Fourier transform (FFT) and/or wavelet transforms.

The procedure described in the foregoing paragraph may be repeated for at least a second media content portion of the temporally related content portion group. An average value may then be computed for the second representations of the first content portion and the second content portion over a time period that separates the first content portion and the second content portion within the temporally related portion group. The average value for the second representations may reliably correspond to the temporally related content portion group over an arbitrary change in a speed of the media content sequence. In an embodiment, the video media content portion comprises a temporal window in (e.g., a temporally early portion of) the video media content, in relation to at least one subsequent video media content portion, of the temporally related group of content portions. Thus, a transform function may be applied over a temporal window, with which the early portion (or other temporal window) and the subsequent portion of the video media content are related in time. Applying the transform function allows description of any change in an image feature of the video content over the temporal window. The basis for this transform may be derived from, or relate to statistics associated with, a set of training data, which may be gathered over multiple samples and frames.

Media signatures that are computed (derived, extracted) according to embodiments of the present invention reliably correspond to the media content portions from which they are derived. The media fingerprints may thus be considered robust content portion identifiers, which are resilient to various signal processing operations on the media content. Media signatures computed according to an embodiment are substantially robust identifiers of media content that may be subjected to various signal processing operations. Some such signal processing operations may constitute attacks on the media content, possibly executed to access the content without rights or authorization to do so, as in media piracy. Signal processing may also or alternatively result from a variety of legitimate applications, as well (e.g., making a movie trailer from a video clip thereof for use by the studio in marketing the movie). Signal processing functions may change media content in one or more ways.

For example, media content may be changed by its subjection to geometric distortions or disturbances, such as stretching or rotation, or to various other signal processing operations, such as compression, brightness scaling, spatial scaling and temporal manipulation, such as frame rate conversion or off-speed playout and/or re-recording. As used herein, the term media signature may refer to a bitstream that is representative of a content portion, such as a temporally discrete segment (e.g., a chunk) of a video or audio signal. Instances of an example segment video clip may exist in various states. A first video clip instance may have a native, substantially identical, natural, or raw state, in relation to an original instance thereof, and may thus exist in an essentially uncompressed format relative thereto. Additionally or alternatively, a second instance of the same video clip may be in a compressed state, relative to an original instance thereof, such as a bitstream from an encoder that is substantially compliant with the H.264/AVC-MPEG4 or MPEG3 codecs. Although the actual bitstreams representing the content and the associated underlying signals may differ for the uncompressed and the compressed formats, their corresponding video content may be perceived by a human of natural, substantially normal psychovisual skills as, for many practical purposes, essentially identical. Many modern audio codecs also function perceptually.

An embodiment functions to compute (derive, extract) signatures from each of the uncompressed and compressed formats or versions of the same media content, which themselves share significant similarity. Media signatures thus computed reliably capture an essence of media content to which they correspond and are substantially robust to various signal processing operations (such as compression) on content data, which preserves the content associated therewith. Moreover, signatures computed according to an embodiment are strongly robust to geometric attacks. Embodiments may thus be used to identify modified versions of, e.g., copyrighted video clips. For example, a hypothetical original copyrighted content may have been modified by various signal processing operations such as compression, brightness scaling, frame rate conversion, geometric distortions etc. Signatures and fingerprints computed therefrom however are robust over such processing operations and thus in the presence thereof, or at least in part responsive thereto, robust against decorrelating with the content from which they are derived. Embodiments may thus reliably allow accurate or precise identification of original copyrighted content, even with signal processing modifications thereto.

An example embodiment functions over an input video signal with division of the video signal into temporally smaller chunks, which may or may not overlap. For each of the video data chunks, features are derived from, and represent the underlying content thereof. A signature, e.g., a relatively low-dimensional bitstream representation of the content, is formed therefrom. As used herein, the term signature, in relation to a media content portion such as a video chunk, may refer to the bitstream representation for that chunk of video data. As used herein, the term video fingerprint may refer to the set of all signatures for all chunks of a video file or other content portion and may thus apply in relation to an essentially entire input video signal. Signatures for each of the video chunks remain substantially similar, even where the content portion instances from which they are respectively derived are subjected to various signal processing operations. An embodiment thus functions based, at least in part, on similarity that may exist between signature features that are derived (sampled, extracted, computed) from various instances of given media content, whether uncompressed or compressed.

Nomenclature, Terms and Example Platforms

As used herein, the term "medium" (plural: "media") may refer to a storage or transfer container for data and other information. As used herein, the term "multimedia" may refer to media which contain information in multiple forms. Multimedia information files may, for instance, contain audio, video, image, graphical, text, animated and/or other information, and various combinations thereof. As used herein, the term "associated information" may refer to information that relates in some way to information media content. Associated information may comprise, for instance, auxiliary content.

As used herein, the terms "derive," "derived," "deriving" and the like may refer to sampling signal components of media content and/or computing, from the samples, a unique, corresponding signature or fingerprint thereof. Terms such as "extracting" signatures or fingerprints may thus also refer to deriving a As used herein, the term "media fingerprint" may refer to a representation of a media content file, which is derived from characteristic components thereof Media fingerprints are derived (e.g., computed, extracted, generated, etc.) from the media content to which they correspond. As used herein, the term "video fingerprint" may refer to a media fingerprint associated with video media with some degree of particularity (although a video fingerprint may also be associated with other media, as well). Media fingerprints used in embodiments herein may correspond to video, image, graphical, text, animated audiovisual and/or other multimedia, other media information content, and/or to various combinations thereof, and may refer to other media in addition to media to which they may be associated with some degree of particularity.

A video fingerprint may comprise a unique digital video file, the components of which are derived (e.g., computed, generated, written, extracted, and/or compressed from characteristic components of video content. Derived characteristic components of video content that may be compressed to form a video fingerprint corresponding thereto may include, but are not limited to, luminance or luma values, chrominance or chroma values, motion estimation, prediction and compensation values, and the like.

Thus, while media fingerprints described herein represent the media content from which they are derived, they do not comprise and (e.g., for the purposes and in the context of the description herein) are not to be confused with metadata or other tags that may be associated with (e.g., added to or with) the media content. Media fingerprints may be transmissible with lower bit rates than the media content from which they are derived. Importantly, as used herein, terms like "deriving," "generating," "writing," "extracting," and/or "compressing," as well as phrases substantially like "computing a fingerprint," may thus relate to obtaining media fingerprints from media content portions and, in this context, may be used synonymously or interchangeably.

These and similar terms may thus relate to a relationship of media fingerprints to source media content thereof or associated therewith. In an embodiment, media content portions are sources of media fingerprints and media fingerprints essentially comprise unique components of the media content. For instance, video fingerprints may be derived from (e.g., comprise at least in part) values relating to chrominance and/or luminance in frames of video content. The video fingerprint may also (or alternatively) comprise values relating to motion estimation, prediction or compensation in video frames, such as motion vectors and similar motion related descriptors. Media fingerprints may thus function to uniquely represent, identify, reference or refer to the media content portions from which they are derived. Concomitantly, these and similar terms herein may be understood to emphasize that media fingerprints are distinct from meta data, tags and other descriptors, which may be added to content for labeling or description purposes and subsequently extracted therefrom. In contexts relating to derivative media content, the terms "derivative" or "derive" may further relate to media content that may represent or comprise other than an original instance of media content.

Example Derivation of a Media Fingerprint

Content within a media sequence may comprise multiple content elements. Video media for instance may comprise multiple video frames. Using a video medium for example, FIG. 1 depicts an example procedure 100 for extracting a content feature from a stream of media data, according to an embodiment of the present invention. Frames of the video sequence stream over time, which may be segmented into intervals $T_{int}$. One or more time intervals $T_{int}$ may comprise a chunk of time $T_{chunk}$ that endures for the duration of a portion of the video sequence. Each interval $T_{int}$ is associated with a group of video frames, $F_1, F_2, \ldots, F_N$, which comprise a portion of the video content that runs for the duration of the interval $T_{int}$.

An embodiment may derive (e.g., compute, extract) media fingerprints over each of the time Intervals $T_{int}$. An interval $T_{int}$ may be derived from a smallest frame rate conversion factor over which the media signatures may be expected to reliably correspond to frames of the original media content from which they are extracted. For example, where the speed of an original video sequence is at 30 frames per second (fps), and its video fingerprint is expected to reliably correspond to the original frame content over a frame rate conversion down to 12 fps, video fingerprints may be extracted every twelfth of a second; thus $T_{int}=\frac{1}{12}$ second. It should be appreciated that embodiments may function substantially without limitation to any given media element rate (e.g., video frame rate) or range thereof.

In step 101, a group of frames $F_1, F_2, \ldots F_N$ about a current interval $T_{int}$ is selected. The group $F_1, F_2, \ldots F_N$ corresponds to a video content portion that runs for a time period that is about the interval $T_{int}$. Thus, frame group $F_1, F_2, \ldots F_N$ may thus include one or more frames that precede the initial instant of $T_{int}$. The group $F_1, F_2, \ldots F_N$ about $T_{int}$ may also include one or more frames that follow the final instant of $T_{int}$.

The duration of a time period over which frame group $F_1, F_2, \ldots F_N$ runs, at a given frame rate, may be referred to herein as a chunk of time $T_{chunk}$. For example, a current interval $T_{int}$ may be referred to as a time step j. Time step j begins at a time instant j−1 and endures until a time instant j. The current frame group $F_1, F_2, \ldots F_N$ about time step j may begin during an interval that endures until j−1, and may expire during an interval that endures until the time instant j+1, with an endurance $T_{chunk}$. For example, step 101 may be implemented such that time chunk $T_{chunk}$ corresponds to frame group $F_1, F_2, \ldots F_N$ running for two seconds (s) about time step j and the frame group $F_1, F_2, \ldots F_N$ may comprise a portion or sequence of input video, which runs at a frame rate of 30 fps. One or more of the frames $F_1, F_2, \ldots F_N$ may overlap multiple time intervals $T_{int}$.

In step 102, the input video stream is temporally downsampled. Continuing the example, a video input with a frame rate of 30 fps may be downsampled to a lower frame rate such as 12 fps by dropping frames. A video input with a frame rate of 15 fps may be similarly downsampled to 12 fps by dropping frames. The number of frames that may be dropped may differ in downsampling distinct video streams of different frame rates. Frames may be dropped to temporally downsample input video of any frame rate, such that the number of frames in the group corresponding to $T_{chunk}$ remains N. For N=24, input video is temporally downsampled so that the selected frame group $F_1, F_2, \ldots F_N$ retains 24 frames.

The value of $T_{chunk}$ may relate to a level of reliability with which a media fingerprint computed according to procedure 300 corresponds to the original media content, from which it is derived over a video processing operation such as frame rate conversion. For instance, time interval $T_{int}$ may be implemented with a value of 2 s and $T_{chunk}$ may be implemented with a value of 3 s. In this example, $T_{chunk}$ is significantly greater than $T_{int}$. A high degree of overlap may exist between the temporally proximate groups of frames used to derive two consecutive signatures. An implementation with a high degree of overlap between the temporally proximate groups of frames derives consecutive signatures therefrom, which may be significantly reliability in their correspondence to the original frames over frame rate conversions.

In step 103, each of the frames $F_1, F_2 \ldots F_N$ is spatially downsampled. In step 104, each of the spatially downsampled frames is cropped into a corresponding representative image. The first representative image of each frame may be referred to herein as a first representation of the frame. For example, frame cropping may be implemented, with reference to FIG. 1 and FIG. 2. The first representative image of each frame may be referred to herein as a first representation of the frame.

Figure 2:
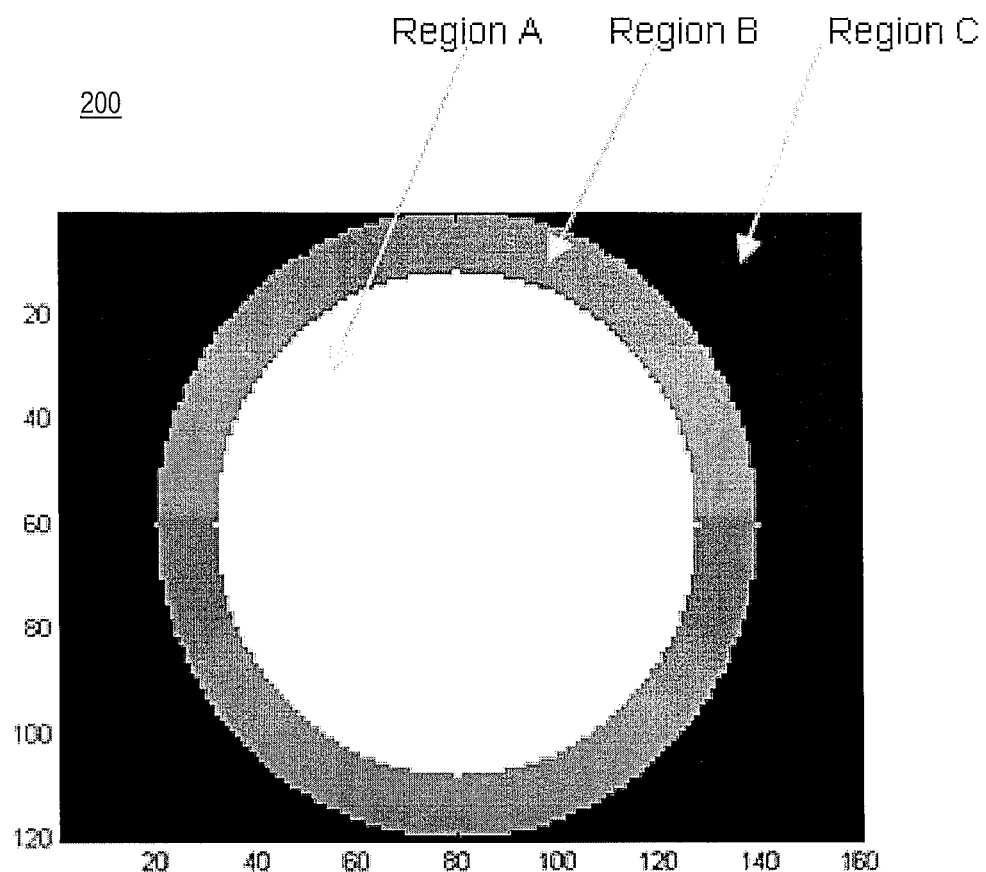
FIG. 2 depicts an example of cropping media content, according to an embodiment of the present invention.

FIG. 2 depicts an example of media content cropping 200, according to an embodiment of the present invention. From each frame image $F_i$, a region A is cropped in step 104 for video signature generation. Region A may be substantially circular in conformation. Where a geometric orientation of frame $F_i$ is changed arbitrarily, a video signature extracted from cropped region A reliably remains conformant to $F_i$. For instance, frame $F_i$ may be rotated axially, e.g., about a pixel somewhere within region A. Despite the changing geometric orientation in $F_i$, pixels included within region A remain within the cropped sub-image. Pixels within cropped region A may thus survive all rotations of the input image $F_i$.

Pixels in region C may well rotate out of the displayed area associated with $F_i$ as the geometric orientation thereof changes. While pixels from image B may survive changes in $F_i$ geometric orientation, an implementation may reserve region B for other uses, such as text overlay in image regions or the incorporation of graphics around corners. Thus, an implementation may set pixel values from regions B and C to 'zero'.

With reference again to FIG. 1, in step 105, each of the representative images is partitioned into a matrix of regions. The regions may conform to blocks, which may be partitioned over a horizontal aspect and a vertical aspect with respect to an orientation of the representative image. The regions may also conform to a configuration besides or in addition to blocks, such as rotational surfaces or warpable sheets, which may partition somewhat differently than blocks.

In step 106, energies within each of the regions are accessed and summed, and the sums quantized into a quantized sum $Q_i$. The energies in each of the regions may be summed with a fast Fourier type transformation, such as the DCT and its variants, e.g., the mDCT, the DFT, FFT, and/or wavelet transforms, for example. Other transformations may also be used for summing the regions' energies. The quantized sum comprises a somewhat coarse presentation of the first representations of the frames. With reference again to FIG. 2, one or more of steps 105 or 106 may effectively be implemented over pixels from region A.

The sub-image cropped out of $F_i$ may be represented by $F^c_i$. $F^c_i$ corresponds in size to $F_i$, however, $F^c_i$ values that are sampled from regions B and C of $F_i$ are forced to zero. A coarse representation $Q_i$ of $F^c_i$ may be obtained by averaging pixel intensities in image blocks of size $W_x * W_y$. With reference to FIG. 2, representation $Q_i$ may be implemented over the 120 vertical by 160 horizontal scales in which the image $F_i$ is displayed such that $M_1 * W_x = 120$ and $M_2 * W_y = 160$, with $Q_i$ having a size of $(M_1 * M_2)$. $Q_i$ may thus, for example, be computed according to Equation 1, below.

$$Q_i(k, l) = \frac{1}{W_x * W_y} \sum_{m=(k-1)W_x}^{kW_x} \sum_{n=(l-1)W_y}^{lW_y} F^c_i(m, n) \quad \text{Equation 1}$$

$$k = 1, 2 \ldots M_1; l = 1, 2 \ldots M_2.$$

In Equation 1, 'm' and 'n' respectively represent indices for the horizontal and vertical dimensions for the image $F^c_i$, and 'k' and 'l' represent indices of the image representation $Q_i$. Coarsened image representations may also be implemented. For example, a coarse 44*60 representation of $Q_i$ by setting $M_1$ to value of 44 and $M_2$ to a value of 60.

Averaging according to Equation 2 essentially also comprises a form of downsampling, and may thus be performed prior to cropping the image as described with reference to step 304. It should be appreciated that the example parameters described are selected for illustration and are not in any sense to be construed as limiting. Embodiments are well suited to function over a wide variety and ranges of the parameters. This coarse representation $Q_i$ preserves the average intensity within a region over variations that may exist therein within the region. The original image may essentially be downsampled to a size $(M_1 * M_2)$ image after cropping. Thus, steps 303-306 may be implemented with fewer (e.g., one) processing steps.

Moreover, estimating basis vectors for frames $F_i$ may also be implemented with fewer computational steps, as well. For instance, basis vectors for the frames may be estimated from the original frames, or may be estimated conceptually, e.g., from representations thereof.

Thus, the first media element representation $Q_i$, essentially quantized energy values from the downsampled and cropped frame image, comprises an output from step 106 (or with fewer processing steps) for each of the frames in the group $F_1, F_2, \ldots F_N$. In step 107, the first media element representation $Q_i$ is buffered.

In block 108, a set of basis vectors $B_1, B_2, \ldots B_N$ is estimated for the sequence $Q_1, Q_2, \ldots Q_N$. In an example embodiment, the basis vectors are estimated on the basis of singular value decomposition (SVD) computed over the sequence $Q_1, Q_2, \ldots Q_N$ of first media element representations. In another embodiment, basis vectors may be estimated on the basis of another computation performed over sequence $Q_1, Q_2, \ldots Q_N$. An embodiment allows the basis vectors to be estimated from any representation of the frames in the group $F_1, F_2, \ldots F_N$. For example, a course representation $F_i$ may be used in a spatial domain ($Q_i$). Alternatively or additionally, the basis vectors may be estimated from a transform domain representation of $F_i$, such as a DCT, mDCT, DFT, FFT or wavelet transform representation.

In step 109, coordinates of $Q_i$ are obtained in a new space, which is spanned by $B_1, B_2, \ldots B_N$, by projecting $Q_i$ onto each of the basis vectors. The projections may be represented as a matrix $Q_{is} = (Q_{i,1}^s, Q_{i,2}^s, \ldots Q_{i,N}^s)$. It should be appreciated that $Q_i$, which comprises a vector of dimension $M_1 * M_2$, is now represented by $Q_{is}$, a vector of dimension N in the new space spanned by $B_1, B_2, \ldots B_N$. Thus, an embodiment transforms a first media element representation into a second media element representation in a new dimensional space, which is unique with respect to its original dimensional space, by projecting the first media element representation based on the estimated basis vectors.

Moreover, the second media element representation may reliably correspond to the original media over an arbitrary change in a geometric orientation of the original media content portion. The basis vectors $B_1, B_2, \ldots B_N$ are estimated from $Q_1, Q_2, \ldots Q_N$. Thus, where the original video content undergoes spatial rotation, a change in aspect ratio, a translational shift along a vertical or horizontal orientation (or with media displayed in more than two spatial dimensions, along a third orientation that is orthogonal to at least one of the vertical or horizontal orientations), an affine warp or another change in geometric orientation, each media element representation $Q_i$ undergoes a corresponding change, as do basis vectors that may be obtained therefrom.

Obtaining basis vectors $B_1, B_2, \ldots B_N$ from $Q_1, Q_2, \ldots Q_N$ may be implemented with creation of a matrix Y. Each column (j) of matrix Y represents a frame $Q_j$. The number of rows within matrix Y is ($M_1 * M_2$), which comprises the number of elements in $Q_j$, scanned row by row. Dimensions of matrix Y are ($M_1 * M_2$)×N. A rank of the matrix Y may comprise a value equivalent to utmost N. The basis vectors $B_1, B_2, \ldots B_N$ may be computed using a singular value decomposition (SVD) of matrix Y. Computing the SVD for matrix Y may be implemented, for example, according to Equation 2, below.

$$Y = USV \qquad \text{Equation 2.}$$

In Equation 2, U has a dimension ($M_1 * M_2$)×N, S has a dimension N×N, and V has a dimension N×N. The columns of U comprise the basis vectors $B_1, B_2, \ldots B_N$. The basis vectors comprise a transform, which essentially diagonalizes the matrix product $YY^T$ and spans the columns of Y. S comprises a diagonal matrix with singular values in an order of decreasing magnitudes. The columns of V comprise basis vectors of a transform that diagonalizes $Y^T Y$ and spans the rows of Y.

Upon obtaining the basis vectors $B_1, B_2, \ldots B_N$, e.g., with SVD computation, coordinates for $Q_i$ may be computed in the new transformed space $Q_{is}$, for example, according to Equation 3, below.

$$Q_i^s = U^t Q_i^v \qquad \text{Equation 3.}$$

A vector $Q_{iv}$, with a dimension ($M_1 * M_2$)×1, may be computed from the matrix $Q_i$ of dimension $M_1 * M_2$. Computing the vector $Q_{iv}$ may be implemented by scanning entries of the matrix in, row by row.

The product $Q_i^s$ reliably represents the corresponding media element representation $Q_i$ over changes in geometric orientation of the original media content. Thus, the product $Q_i^s$ comprises a second representation of a first media element representation $Q_i$. The second representation $Q_i^s$ may be essentially invariant to geometric media content changes.

In step 110, a temporal average is computed over the new coordinates $Q_i^s$. The temporally averaged coordinates $Q_i^s$ reliably corresponds to the original media content over speed changes in the video sequence. Thus, $Q_i^s$ may be robust to frame rate conversion, in addition to changes in geometric orientation. Computing a temporal average G for the sequence $Q_1^s, Q_2^s, \ldots Q_i^s$, may be implemented, for example, according to Equation 4, below.

$$G(l) = \frac{1}{N} \sum_{i=1}^{N} Q_i^s(l) \qquad \text{Equation 4}$$

$$l = 1, 2 \ldots N.$$

In an embodiment, the video media content portion comprises a temporal window in (e.g., temporally early portion of) the video media content, in relation to at least one subsequent video media content portion, of the temporally related group of content portions. Thus, a transform function may be applied over a temporal window, with which the early portion (or another temporal window) and the subsequent portion of the video media content are related in time. Applying the transform function allows description of any change in an image feature of the video content over the temporal window. The basis for this transform may be derived from, or relate to statistics associated with, a set of training data, which may be gathered over multiple samples and frames.

In step 111, the first L values of G are selected, which have the temporal average of N projections for a current time step, and stored in a buffer D that has a size of R×L. Buffer D maintains the top L values of G for R recent time steps. Thus, buffer D may capture a variation in the top L values of G over time. A subset of values for G may be stored in buffer as a matrix D for the R recent time steps.

In step 112, signature bits are created for the matrix D. Creating the signature bits may be implemented with creation of K vectors $P_1, P_2, \ldots P_K$, which may have the same dimension as matrix D. Matrix D may be projected onto the set of K vectors according to Equation 5, below.

$$H_k = \sum_{i=1}^{M_1} \sum_{j=1}^{M_2} DZ_r(i, j) * P_k(i, j). \qquad \text{Equation 5}$$

Figure 3:
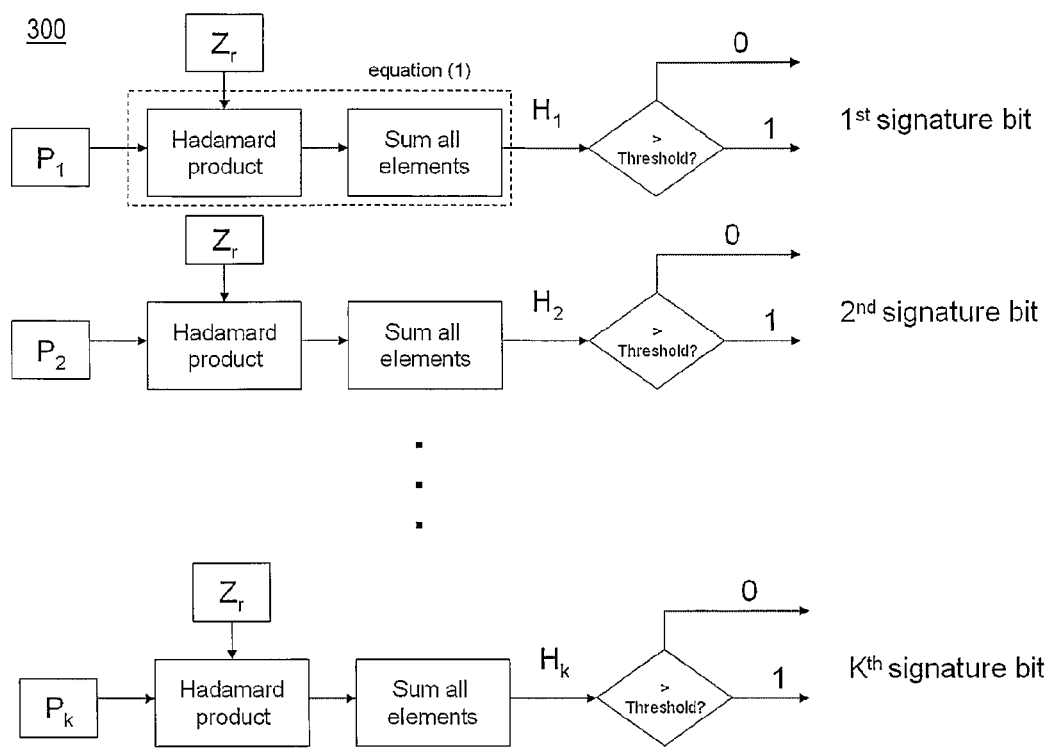
FIG. 3 depicts a second example procedure, according to an embodiment of the present invention.

The signature bits may be derived by thresholding the $K_1$ projections. FIG. 3 depicts a procedure 300 for creating hash bits based on projections onto pseudo-vectors, with which an embodiment of the present invention may function. The projections based on the set of $K_1$ vectors $P_1, P_2, \ldots P_{K1}$ may capture different aspects of the matrix D. For example, if any two of the $K_1$ vectors are similar, then two bits out of the $K_1$ bits will be identical. Thus, an orthogonal basis set of $K_1$ vectors may be used. Alternatively, a set of $K_1$ pseudo-random vectors may be used, as it is assumed that the $K_1$ pseudo-random vectors are approximately orthogonal to each other.

$K_1$ hash bits may be created from D based on Hadamard product projections $H_1, H_2, \ldots, HK_1$ onto $K_1$ pseudo-random vectors. For the number i running from 1 through $K_1$, the $i^{th}$ signature bit may be set to a value of '1' if $H_i$ is greater than the median of $H_1, H_2, \ldots HK_1$. Where the $H_i$ is not greater than the median of $H_1, H_2, \ldots HK_1$ however, the corresponding signature bit may be set to a value of '0'. In a substantially similar manner, $K_2$ hash bits are created from $V_r$ bits.

In re-generating a video fingerprint from modified video content, e.g., for comparison or reference to fingerprints of corresponding original video content, values for the parameters $T_{chunk}$, $M_1$, $M_2$, K, L and R, and for the pseudo-random matrices, may be essentially unchanged.

Step 108, in which basis vectors $B_1, B_2, \ldots B_N$ are estimated, e.g., using SVD of matrix Y, may be computationally intensive. Matrix Y has size $(M_1*M_2) \times N$, and each column of matrix Y has elements of Qi, in which i may have values that run from one to N. Thus, for every next time step, the first column of matrix Y is removed and a new column is added. Incremental updating of the matrices U,S and V obtained from the previous time step may be implemented. Incrementally updating matrices U,S and V, obtained from the previous time step, may obviate computing an SVD over matrix Y for each current time step.

Incremental updating of the SVD for matrix Y may be implemented with two computational operations, which may begin with a removal of the first column of matrix Y, according to the expression $Y+AB^T$, in which 'A' comprises a vector with a dimension $(M_1*M_2) \times 1$, and may be equal to the negative of the first column that being removed from matrix Y, and in which 'B' comprises a vector with a dimension $N \times 1$ and is equal to $[1, 0, 0, \ldots 0]$.

Matrix Y was equated above to USV. Thus, updating the SVD of matrix Y to implement incremental updating may proceed as follows. A vector P comprises an orthogonal basis of vector $A-U(U^T A)$. Vector $A-U(U^T A)$ is a component of A that is orthogonal to U. Computing P may be implemented by QR-decomposition, e.g., using Gram Schmidt Orthogonalization according to Equation 6, below. In Equation 6, the expression $R_A$ may be equivalent to $P^T(A-U(U^T A))$.

Deriving signature bits may be implemented by thresholding the K projections. Projections based on the set of K vectors $P_1, P_2, \ldots P_K$ may capture different aspects of matrix D.

An orthogonal basis set of K vectors or a set of K pseudo-random vectors may be implemented. Implementing K vectors that are oriented orthogonally with respect to the basis vectors, or a set of K pseudo-random vectors, may, for two of the K vectors that are similar, avoid an inability to distinguish two bits out of the K bits. Where a set of K pseudo-random vectors is implemented, it may be assumed that the K pseudo-random vectors are approximately orthogonal to each other.

Matrix Y was equated above to USV. Thus, updating the SVD of matrix Y to implement incremental updating may proceed as follows. A vector P comprises an orthogonal basis of vector $A-U(U^T A)$. Vector $A-U(U^T A)$ is a component of A that is orthogonal to U. Computing P may be implemented by QR-decomposition, e.g., using Gram Schmidt Orthogonalization, for example, according to Equation 6, below. In Equation 6, the expression $R_A$ may be equivalent to $P^T(A-U(U^T A))$.

$$[U, P]\begin{bmatrix} I & U^T A \\ 0 & R_A \end{bmatrix} \overset{QR}{\leftarrow} [U, A].\qquad\text{Equation 6}$$

Similarly, a vector Q comprises an orthogonal basis of the vector $B-V(V^T B)$. Vector $B-V(V^T B)$ comprises a component of basis vector B that is orthogonal to V. Computing Q may also be implemented with QR-decomposition, in which the expression $R_B$ may be equivalent to $Q^T(B-V(V^T B))$.

Removing the first column of matrix Y may be implemented with computing the SVD of the right-hand side (RHS) to compute of the SVD of $(Y+AB^T)$, for example, according to Equation 7, below.

$$[U, P]^T (Y + AB^T)[V, Q] = \begin{bmatrix} S & 0 \\ 0 & 0 \end{bmatrix} +\qquad\text{Equation 7}$$
$$[U, P]^T (AB^T)[V, Q]$$
$$= \begin{bmatrix} S & 0 \\ 0 & 0 \end{bmatrix} + \begin{bmatrix} U^T A \\ R_A \end{bmatrix}\begin{bmatrix} V^T B \\ R_B \end{bmatrix}^T.$$

Equation 7 implies that it is sufficient to compute the SVD of the right-hand side (RHS) to compute of the SVD of (Y+ABT). Where the SVD of the RHS terms of Equation 7 is given as $U°S°V°$, updating the SVD of the expression:

$Y+AB^T$ may be implemented according to Equation 8, below.

$$U*S*V*^T=([U,P]U°)S°([V,Q]V°)\qquad\text{Equation 8.}$$

The term U*S*V* comprises a decomposition of the expression $Y+AB^T$. Thus, updating the SVD may be implemented by computing an SVD over a matrix having a dimension $(N+1) \times (N+1)$, such as the RHS terms of Equation 7. Computing the SVD for the RHS of Equation 7 may obviate a more expensive computation of the SVD of expression $(Y+AB^T)$, which has a dimension $(M_1*M_2) \times (N+1)$. In an example implementation, N may be set at a value of 39, which may be contrasted with a value for $(M_1*M_2)$ of (34*40), which is 1,360. It should be appreciated however, that other values and ranges thereof for N may be implemented.

As discussed above, upon removing a column, incrementally updating the SVD of matrix Y may further be implemented with the addition of a new column to the matrix. Adding a new column to matrix Y may be implemented using the expression $Y+AB^T$, in which the term 'A' comprises a vector having a dimension $(M_1*M_2) \times 1$, which is essentially equivalent to a new column that is to be added to matrix Y, and in which the term 'B' comprises a vector having a dimension $(N+1) \times 1$, which is essentially equivalent to $[0, 0, 0, \ldots 1]$. Incrementally updating the SVD for the expression $Y+AB^T$ may then further be implemented according to one or more of the Equations 6, 7, and 8, above.

Example embodiments of the present invention are described above in relation to media fingerprints that reliably correspond to media content. In the description of example embodiments, e.g., with reference to FIG. 1 and FIG. 2, video media have been used as an example. As discussed above, video media was selected as an example medium in the description above merely for simplicity and unity and, except as expressly stated to the contrary, should not be construed as limiting an embodiment to a particular medium. Embodiments of the present invention are well suited to function with audio media, as well as video media.

For instance, embodiments are well suited to generate acoustic signatures and composite acoustic fingerprints thereof from audio media such as sound, music and speech recordings. The audio media may be associated with video media, such as a recorded soundtrack that may be encoded with video media, and/or with another multimedia format.

While video frames are used above as examples in describing media content elements, embodiments are well suited to function with audio spectrograms of an audio clip as media content clips, as well. As applied to the description above, an audio clip may thus comprise a portion of audio media content that streams over time. Procedure 300 may be applied over a spectrogram of the audio clip to extract a corresponding acoustic fingerprint. For every time step $T_{chunk}$, a new spectral representation is added to, and an old spectral representation is removed from, the audio spectrogram.

An acoustic fingerprint extracted from the audio spectrogram according to the present embodiment reliably corresponds to the audio spectrogram over an arbitrary change in a geometric orientation thereof, such as audio pitch shifting and off-speed audio play. For instance, pitch shifting effects may be considered as essentially a non-linear stretch of the audio spectrogram along a frequency dimension. Procedure 300 describes the audio data using a set of basis functions, which are estimated from the audio data itself. Thus, the procedure allows extracting a feature from the audio spectrogram that is invariant to distortions of the spectrogram.

Example Implementation Platforms

Embodiments of the present invention, such as a part of procedures 100 and 300 (FIGS. 1, 3, respectively) may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components.

Figure 4:
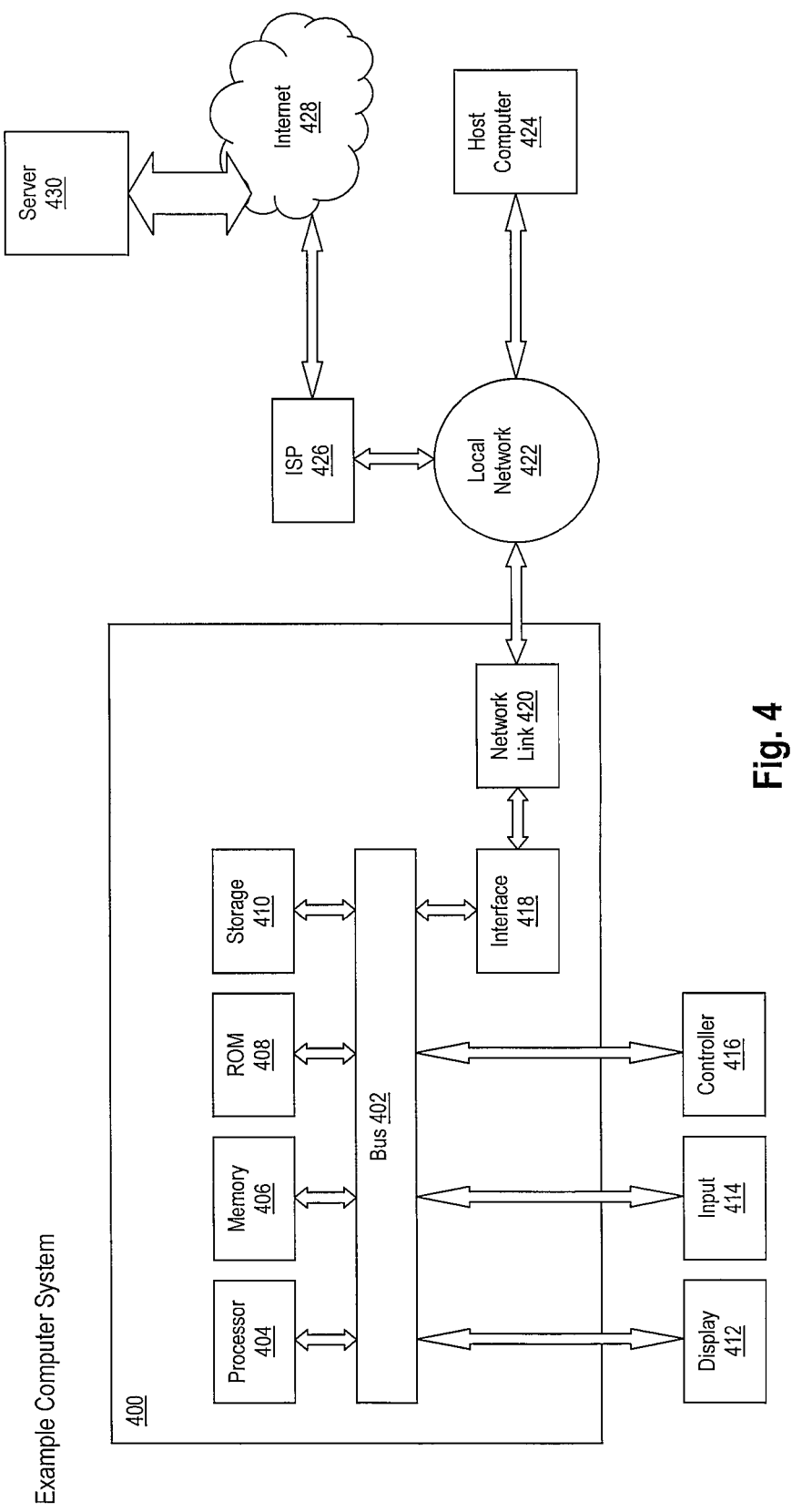
FIG. 4 depicts an example computer system platform, with which an embodiment of the present invention may be implemented.

FIG. 4 depicts an example computer system platform 400, with which an embodiment of the present invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. Processor 404 may perform one or more digital signal processing functions.

Computer system 400 may be coupled via bus 402 to a display 412, such as a liquid crystal display (LCD), cathode ray tube (CRT) or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing media fingerprints that reliably conform to media content. According to one embodiment of the invention, rewriting queries with remote objects is provided by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile storage media, volatile media, and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and other conductors and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a digital subscriber line (DSL), cable or other modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for implementing media fingerprints that reliably conform to media content, as described herein.

The received code may be executed by processor 404 as it is received, and/or stored in storage device 410, or other non-volatile storage for later execution. In this manner, computer system 400 may obtain application code in the form of a carrier wave.

Figure 5:
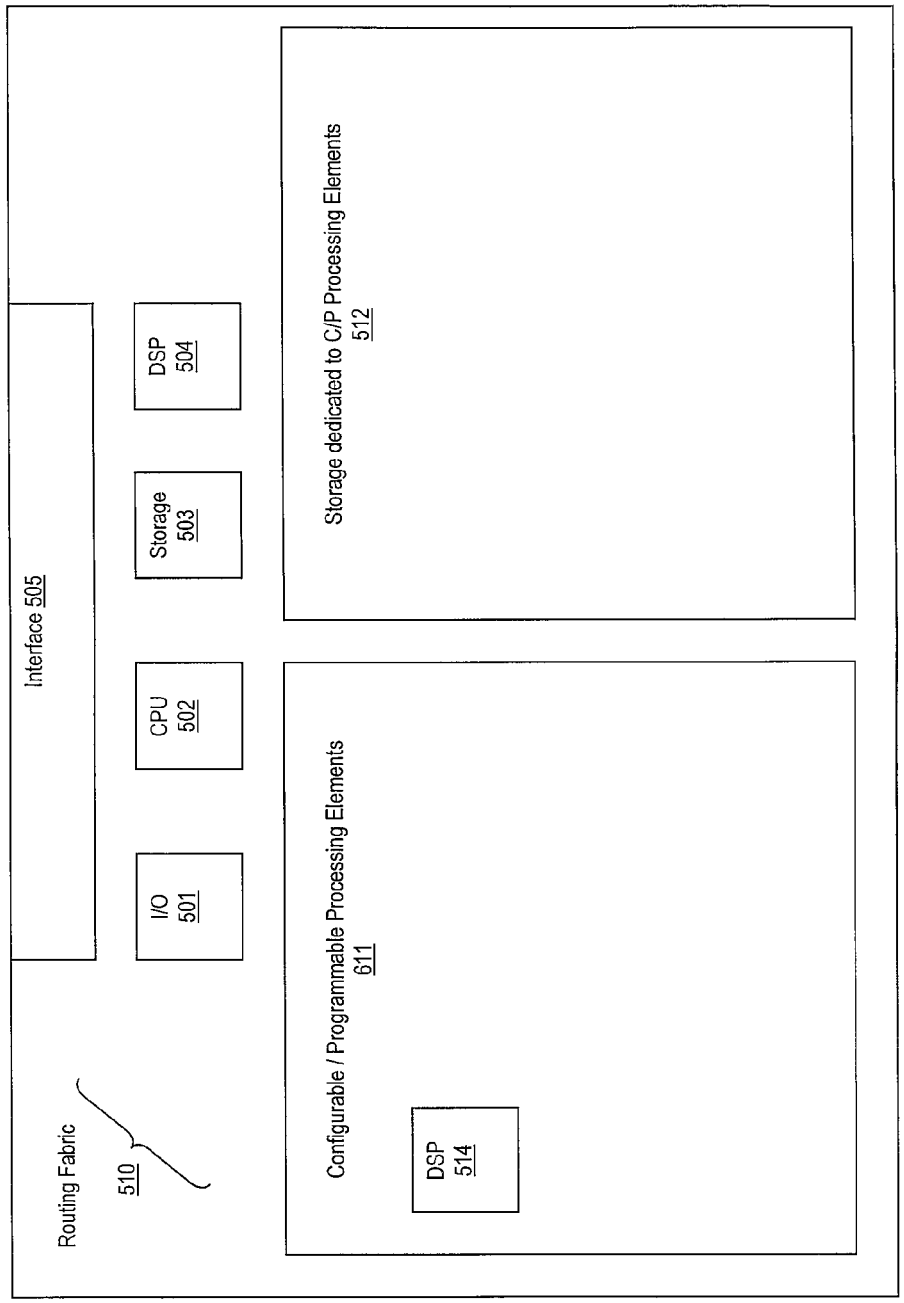
FIG. 5 depicts an example integrated circuit device, with which an embodiment of the present invention may be implemented.

FIG. 5 depicts an example IC device 500, with which an embodiment of the present invention may be implemented. IC device 500 may have an input/output (I/O) feature 501. I/O feature 501 receives input signals and routes them via routing fabric 510 to a central processing unit (CPU) 502, which functions with storage 503. I/O feature 501 also receives output signals from other component features of IC device 500 and may control a part of the signal flow over routing fabric 510. A digital signal processing (DSP) feature performs at least function relating to digital signal processing. An interface 505 accesses external signals and routes them to I/O feature 501, and allows IC device 500 to export signals. Routing fabric 510 routes signals and power between the various component features of IC device 500.

Configurable and/or programmable processing elements (CPPE) 511, such as arrays of logic gates may perform dedicated functions of IC device 500, which in an embodiment may relate to extracting and processing media fingerprints that reliably conform to media content. Storage 512 dedicates sufficient memory cells for CPPE 511 to function efficiently. CPPE may include one or more dedicated DSP features 514.

Example Video Signature Generation

Figure 6:
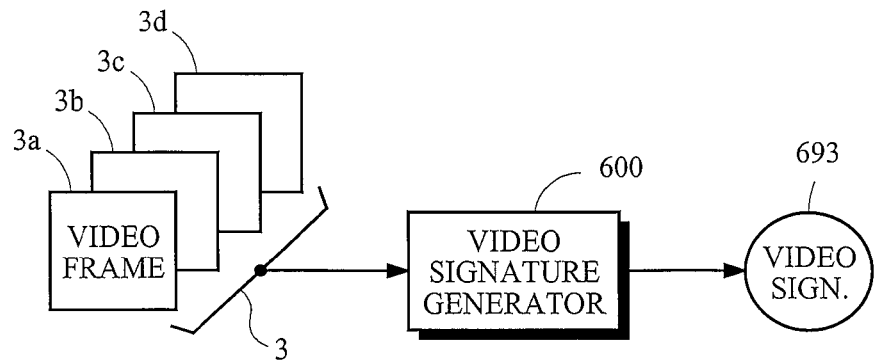
FIGS. 6 and 7 are schematic block diagrams of a video signature generator that may be used to obtain a reliable identification of a video signal, according to an embodiment of the present invention.

FIG. 6 is a schematic block diagram of a video signature generator 600 that analyzes the video content in a signal segment 3 to generate a video signature 193 that identifies or represents that content. In the example shown, the segment 3 includes a series of video frames 3a to 3d. If the video signal conveys audio content as well as video content, an audio signature that represents the audio content may be obtained by processing the audio content in a variety of ways.

Video Signature Extractor

Figure 7:
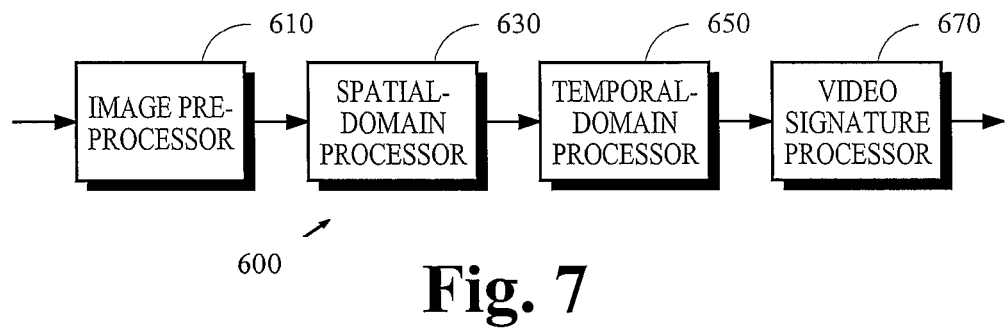

One implementation of the video signal generator 600 is illustrated in FIG. 7. In this implementation, an image pre-processor 610 obtains a series of format-independent images for the pictures conveyed in the frames 3a, 3b, 3c, 3d, a spatial-domain processor 630 down-samples the format-independent images to generate a series of lower-resolution representations of the format-independent images, a temporal-domain processor 650 generates values that represent a composite of the series of lower-resolution representations, and a video signature processor 670 applies a hash function to the composite values to generate the video signature 193 that represents and identifies the content of the segment 3. The processing that is performed by the processors 610, 630, 650 and 670 may be implemented in a variety of ways. Preferred implementations of these processes are described below.

Image Pre-Processor

For one exemplary implementation, each video frame 3a, 3b, 3c, 3d in the segment 3 conveys a picture that is represented by an array of pixels D. The image pre-processor 610 derives a format-independent image of the picture for each frame. The format-independent image is represented by an array of pixels F. The derivation of the format-independent image may be done in a variety of ways. A few examples are described below.

In one application, the video signature generator 600 generates signatures for television video signals that convey video content in a variety of formats including progressive-scan and interlaced-scan with the standard-definition (SD) resolution of 480×640 pixels and the high-definition (HD) resolution of 1080×1920 pixels. The image pre-processor 610 converts the picture in each frame into a format-independent image that has a format common to all signal formats of interest. In preferred implementations, the pixels F in the format-independent images are obtained by down-sampling the pixels D in the frame to reduce sensitivity to modifications that can occur when frames of video are converted between different formats.

In one example, the resolution of the format-independent image is chosen to have a resolution of 120×160 pixels, which is a convenient choice for television signals conveying images in HD and SD resolutions for both progressive-scan interlaced-scan formats. The image pre-processor 610 converts SD-format video content into format-independent images by down-sampling the pixels in each frame picture by a factor of four. The image pre-processor 610 converts HD-format video content into format-independent images by cropping each frame picture to remove 240 pixels from the left-hand edge and 240 pixels from right-hand edge to obtain an interim image with a resolution of 1080×1440 pixels and down-sampling the pixels in the interim image by a factor of nine.

If a video signal conveys content in an interlaced-scan format in which frames of video are arranged in two fields, the signal may be converted into a progressive-scan format before obtaining the format-independent image. Alternatively, greater independence from the choice of scan format can be achieved by obtaining the format-independent image from only one of the fields in an interlaced-scan frame. For example, the format-independent image can be obtained from only the first field in each frame or from only the second field in each frame. Video content in the other field can be ignored. This process avoids the need to convert to a progressive-scan format before obtaining the format-independent image.

If appropriate cropping and down sampling is used, the resultant image is essentially independent of the frame picture format so that the subsequent signature generation process is insensitive to different formats and to modifications that occur from conversions between formats. This approach increases the likelihood that a video signature generated from a series of format-independent images will correctly identify the video content in a series of frame pictures even if those pictures have been subjected to format conversion.

Preferably, the format-independent image excludes picture areas that are likely to be affected by intentional modifications. For video applications such as television, for example, this may be achieved by cropping to exclude corners and edges of the image where logos or other graphical objects may be inserted into the video content.

Figure 8:
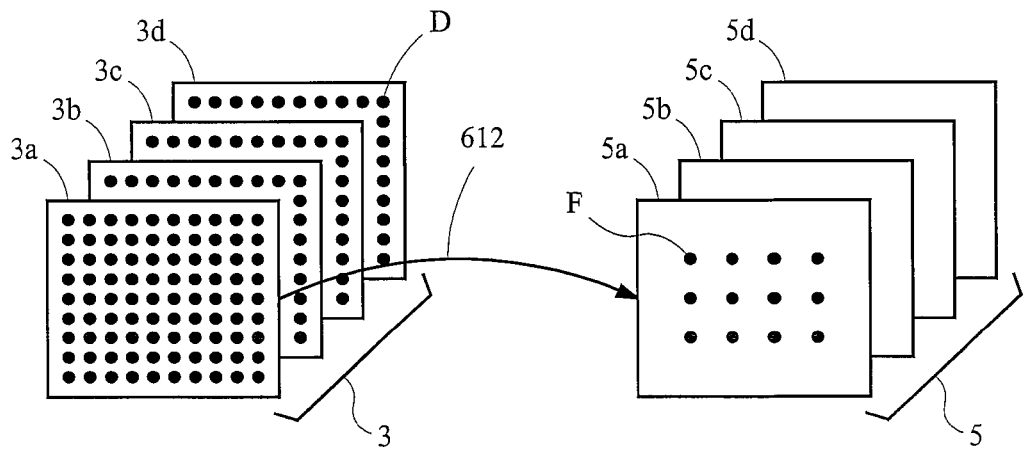
FIG. 8 is a schematic block diagram of a process performed in one implementation of an image pre-processor.

FIG. 8 provides a schematic illustration of the results obtained by a process 612 performed by the image pre-processor 610 that includes the cropping and down-sampling operations described above. The picture in the frame 3a within the segment 3 is cropped to extract the pixels D in a central portion of the picture. The pixels D in this central portion are down-sampled to obtain the pixels F in the format-independent image 5a. A format-independent image 5a, 5b, 5c, 5d in a series of images 5 is obtained for each frame 3a, 3b, 3c, in the segment 3. The process 612 may be expressed as:

$$\{F_m\} = IP[\{D_m\}] \text{ for } 0 \leq m < M \tag{1}$$

where $\{F_m\}$=the set of pixels in the format-independent image for frame m;
IP[ ]=the image pre-processor operations applied to the picture in frame m;
$\{D_m\}$=the set of pixels in the picture for frame m; and
M=the number of frames in the segment.

The cropping operation that resizes a picture for format conversion may be combined with or performed separately from the cropping operation that excludes areas of a picture that may be affected by intentional modification such as the insertion of logos. The cropping operations may be performed before or after the down-sampling operations. For example, the format-independent image may be obtained by cropping video content and subsequently down sampling the cropped images, it can be obtained by down sampling the video content and subsequently cropping the down-sampled images, and it can be obtained by a down-sampling operation performed between the two cropping operations mentioned above.

If each video frame conveys a color image comprising pixels represented by red, green and blue (RGB) values, for example, a separate format-independent image may be obtained for each of the red, green, and blue values in each frame. Preferably, one format-independent image is obtained for each frame from the luminance or brightness of pixels that is derived from the red, green, and blue values in the frame. If each video frame conveys a monochromatic image, the format-independent image may be obtained from the intensities of the individual pixels in that frame.

Spatial-Domain Processor

Figure 9:
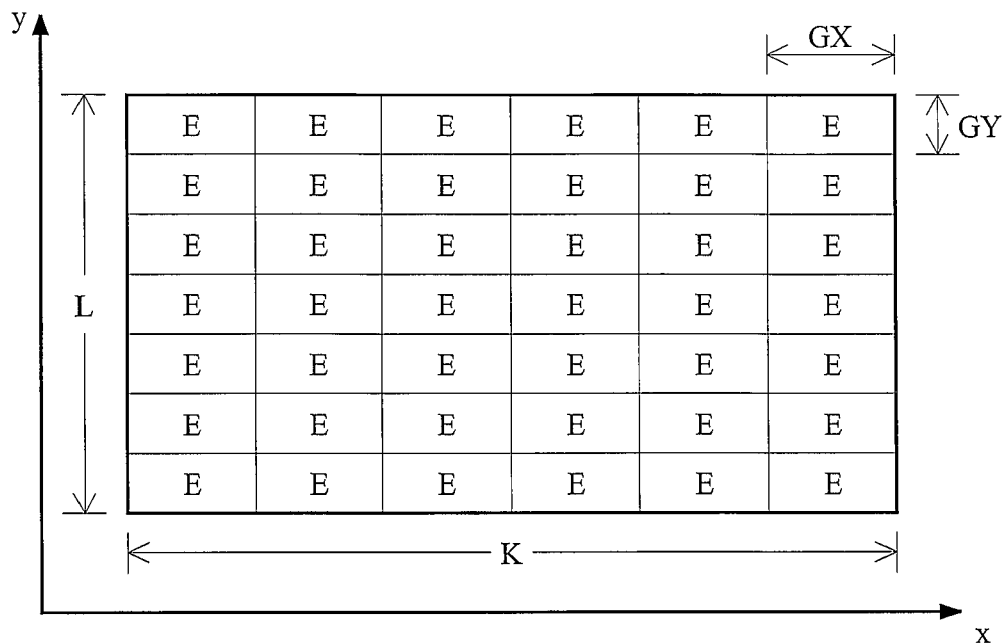
FIG. 9 is a schematic block diagram of a lower-resolution image obtained by a spatial-domain processor, according to an embodiment of the present invention.

In an exemplary implementation, the spatial-domain processor 630 obtains a down-sampled lower-resolution representation of the format-independent images by grouping the pixels F in each of the format-independent images into regions that are GX pixels wide and GY pixels high. A lower-resolution image with picture elements E is derived from the intensities of the pixels F in a respective format-independent image by calculating the average intensity of the pixels in each region. Each lower-resolution image has a resolution of K×L elements. This is illustrated schematically in FIG. 9. The picture elements E may be obtained by performing a process that implements the following expression:

$$E_m(k, l) = \frac{1}{GX \cdot GY} \sum_{i=k \cdot GX}^{(k+1) \cdot GX - 1} \sum_{j=l \cdot GY}^{(l+1) \cdot GY - 1} F_m(i, j) \text{ for } 0 \leq k < K; \tag{2}$$

$$0 \leq l < L; 0 \leq m < M$$

where $E_m(k,l)$=a picture element in the lower-resolution image for frame m;
GX=the width of pixel groups expressed in numbers of pixels F;
GY=the height of pixel groups expressed in numbers of pixels F;
K=the horizontal resolution of the lower-resolution image;
L=the vertical resolution of the lower-resolution image; and
$F_m(i,j)$=a pixel in the format-independent image for frame m.

The horizontal size GX of the groups is chosen such that K·GX=RH and the vertical size GY of the groups is chosen such that L·GY=RV where RH and RV are the horizontal and vertical resolutions of the format-independent image, respectively. For the exemplary implementation discussed above that generates elements in a down-sampled format-independent image with a resolution of 120×160 pixels, one suitable size for the groups is 8×8, which provides a lower-resolution image with a resolution of 120/8×160/8=15×20 picture elements.

Alternatively, the grouping performed by the spatial-domain processor 630 can be combined with or performed prior to processing performed by the image pre-processor 610.

By using the lower-resolution picture elements E to generate a video signature rather than the higher-resolution pixels F, the generated video signature is less sensitive to processes that change details of video signal content but preserve average intensity.

Temporal-Domain Processor

In an exemplary implementation of the temporal-domain processor 650, values that represent a composite of the series of lower-resolution images are obtained from the temporal averages and variances of respective picture elements E.

The temporal average Z(k,l) of each respective picture element E(k,l) may be calculated from the following expression:

$$Z(k, l) = \frac{1}{M} \sum_{m=0}^{M-1} E_m(k, l) \text{ for } 0 \leq k < K; 0 \leq l < L \tag{3a}$$

Alternatively, the video content of selected frames within the segment 3 may be given greater importance by calculating the temporal averages from a weighted sum of the picture elements as shown in the following expression:

$$Z(k, l) = \frac{1}{M} \sum_{m=0}^{M-1} w_m \cdot E_m(k, l) \text{ for } 0 \leq k < K; 0 \leq l < L \tag{3b}$$

where $w_m$=the weighting factor for picture elements in the lower-resolution image derived from the video content of frame m.

If desired, the time-domain process represented by expression 3a or 3b may be performed prior to the spatial-domain process represented by expression 2.

The value Z(k,l) represents an average intensity for each picture element E(k,l) over both time and space; therefore, these average values do not convey much information about any motion that may be represented by the video content of the segment 3. A representation of motion may be obtained by calculating the variance of each picture element E(k,l).

If the average value Z(k,l) for each picture element E(k,l) is calculated as shown in expression 3a, the variance V(k,l) of each respective picture element E(k,l) may be calculated from the following expression:

$$V(k, l) = \frac{1}{M} \sum_{m=0}^{M-1} (E_m(k, l) - Z(k, l))^2 \text{ for } 0 \leq k < K; 0 \leq l < L \tag{4a}$$

If the average value for each picture element is calculated as shown in expression 3b, the variance V(k,l) of each respective picture element E(k,l) may be calculated from the following expression:

$$V(k, l) = \frac{1}{M} \sum_{m=0}^{M-1} (w_m \cdot [E_m(k, l) - Z(k, l)])^2 \text{ for } 0 \leq k < K; \tag{4b}$$

$$0 \leq l < L$$

In a preferred implementation, the values that represent a composite of the series of lower-resolution images are the values of elements in two rank matrices $Z_r$ and $V_r$ that are derived from the temporal average and variance arrays Z and V, respectively. The value of each element in the rank matrices represents the rank order of its respective element in the associated arrays. For example, if the element Z(2,3) is the fourth largest element in the average value array Z, the value of the corresponding element $Z_r(2,3)$ in the rank matrix $Z_r$ is equal to 4. For this preferred implementation, the composite values QZ and QV may be expressed as:

$$QZ(k,l)=Z_r(k,l) \text{ for } 0 \leq k<K; \ 0 \leq l<L \tag{5}$$

$$QV(k,l)=V_r(k,l) \text{ for } 0 \leq k<K; \ 0 \leq l<L \tag{6}$$

The use of rank matrices is optional. In an alternate implementation, the values that represent a composite of the series of lower-resolution images are the values of the elements in the temporal average and variance arrays Z and V. For this alternate implementation, the composite values QZ and QV may be expressed as:

$$QZ(k,l)=Z(k,l) \text{ for } 0 \leq k<K; \ 0 \leq l<L \tag{7}$$

$$QV(k,l)=V(k,l) \text{ for } 0 \leq k<K; \ 0 \leq l<L \tag{8}$$

Video Signature Processor

The video signature processor 670 applies a hash function to K×L arrays of the composite values QZ and QV to generate two sets of hash bits. A combination of these two sets of hash bits constitute the video signature that identifies the content of the segment 3. Preferably, the hash function is relatively insensitive to changes in the composite values and more sensitive to changes in any hash key that may be used. Unlike a typical cryptographic hash function whose output changes significantly with a change to even a single bit of its input, a preferred hash function for this application provides an output that undergoes only small changes for small changes in the input composite values. This allows the generated video signature to change only slightly with small changes to video content.

One suitable hash function uses a set of $N_Z$ base matrices to generate a set of $N_Z$ hash bits for the QZ composite values, and uses a set of $N_V$ base matrices to generate a set of $N_V$ hash bits for the QV composite values. Each of the base matrices is a K×L array of elements. These elements represent a set of vectors that preferably are orthogonal or nearly orthogonal to one another. In the implementation described below, the elements of the base matrices are generated by a random-number generator under the assumption that these elements represent a set of vectors that are nearly orthogonal to one another.

The matrix elements $pz_n(k,l)$ of each base matrix $PZ_n$ for use with the composite values QZ may be generated from the following expression:

$$pz_n(k,l)=RNG-\bar{p}_n \text{ for } 1 \leq n \leq N_Z, 0 \leq k<K, 0 \leq l<L \tag{9}$$

where RNG=the output of a random-number generator; and $\bar{p}_n$=the average value of the numbers generated by RNG for each matrix.

The matrix elements $pv_n(k,l)$ of each base matrix $PV_n$ for use with the composite values QV may be generated from the following expression:

$$pv_n(k,l)=RNG-\bar{p}_n \text{ for } 1 \leq n \leq N_V, 0 \leq k<K, 0 \leq l<L \tag{10}$$

The generator RNG generates random or pseudo-random values that are uniformly distributed in the range [0,1]. The initial state of the generator may be initialized by a hash key, which allows the hash function and the generated video signature to be cryptographically more secure.

One set of hash bits $BZ_n$ is obtained by first projecting the composite values QZ onto each of the $N_Z$ base matrices, which may be expressed as:

$$HZ_n = \sum_{k=0}^{K-1} \sum_{l=0}^{L-1} QZ(k,l) \cdot pz_n(k,l) \text{ for } 1 \leq n \leq N_Z \tag{11}$$

where $HZ_n$=the projection of the composite values QZ onto the base matrix $PZ_n$.

The set of hash bits $BZ_n$ is then obtained by comparing each projection to the median value of all projections and setting the hash bit to a first value if the projection is equal to or exceeds the threshold and setting the hash bit to a second value if the projection is less than the threshold. One example of this process may be expressed as:

$$BZ_n = \text{sgn}(HZ_n - \overline{H}_Z) \tag{12}$$

where $$\text{sgn}(x) = \begin{cases} 0 & \text{for } x < 0 \\ 1 & \text{for } x \geq 0 \end{cases} \text{ and}$$

$\overline{H}_Z$=the median value of all projections $HZ_n$.

Another set of hash bits $BV_n$ is obtained in a similar manner as shown in the following expressions:

$$HV_n = \sum_{k=0}^{K-1} \sum_{l=0}^{L-1} QV(k,l) \cdot pv_n(k,l) \text{ for } 1 \leq n \leq N_V \tag{13}$$

$$BV_n = \text{sgn}(HV_n - \overline{H}_V) \tag{14}$$

where $HV_n$=the projection of the composite values QV onto the base matrix $PV_n$; and $\overline{H}_V$=the median value of all projections $HV_n$.

The video signature is obtained from a concatenation of the two sets of hash bits, which forms a value that has a total bit length equal to $N_Z+N_V$. The values for $N_Z$ and $N_V$ may be set to provide the desired total bit length as well as weight the relative contribution of the composite values QZ and QV to the final video signature. In one application mentioned above that generates video signatures for television signals, $N_Z$ and $N_V$ are both set equal to eighteen.

Applications

Signature Sets

A signature generated by the video signature generator 600 represents the video content of the segment from which the signature was generated. A reliable identification of the video content in an interval of a signal much longer than a segment can be obtained by generating a set of signatures for the segments included in that interval.

Figure 10:
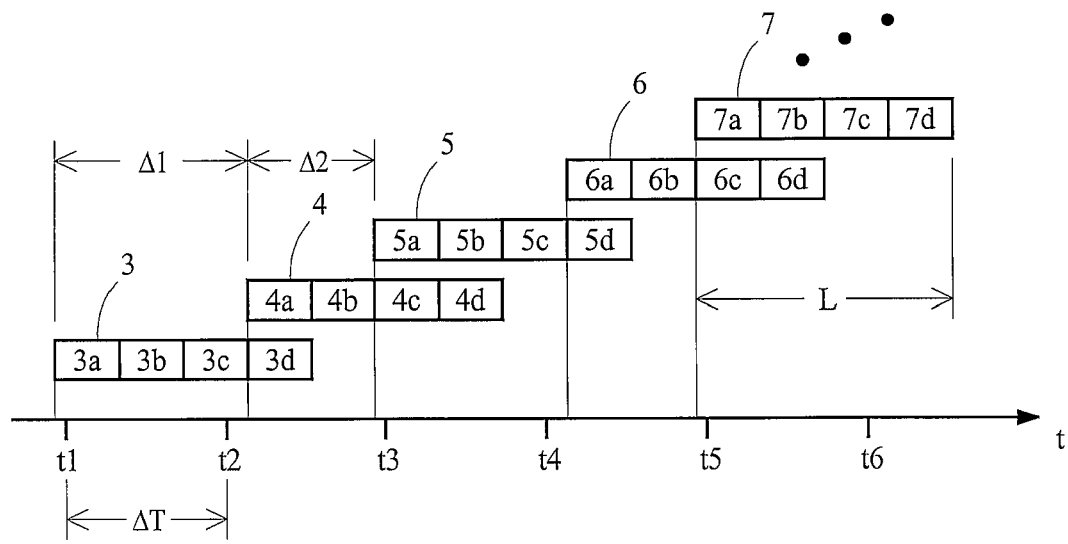
FIG. 10 is a schematic block diagram of video frames arranged in segments, according to an embodiment of the present invention.

The diagram shown in FIG. 10 is a schematic illustration of an interval of a signal that includes several segments of video frames. Five segments are shown. The first segment 3 of the signal includes video frames 3a to 3d. Each subsequent segment 4, 5, 6, 7 includes video frames 4a to 4d, 5a to 5d, 6a to 6d and 7a to 7d, respectively. A set of signatures can be generated for these segments by using the video signal generator 600 to process the contents of the video frames in each segment as described above.

Each segment contains an integral number of video frames. Preferably, the series of frames in each segment conveys video content for an interval of time that is equal to a nominal length L or within one frame period of the nominal length L. The term "frame period" refers to the duration of the video content conveyed by one frame. The nominal start times t # for successive segments are separated from one another by an offset ΔT. This offset may be set equal to the frame period of the lowest frame rate of signals to be processed by the video signature generator 600. For example, if the lowest rate to be processed is twelve frames per second, the offset ΔT may be set equal to 1/12 sec. or about 83.3 msec.

The nominal length L may be chosen to balance competing interests of decreasing the sensitivity of the subsequently-generated video signature to content modifications such as frame-rate conversion and increasing the temporal resolution of the representation provided by the video signature. Empirical studies have shown that a nominal segment length L that corresponds to about two seconds of video content provides good results for many applications.

The specific values mentioned for the segment length L and the offset amount ΔT are only examples. If the offset ΔT is not equal to an integer number of frame periods, the offset between the actual start times of successive segments can vary as shown in the figure by the different offset amounts Δ1 and Δ2. If desired, the length of the offset between actual start times may kept within one frame period of the nominal offset ΔT.

Figure 11:
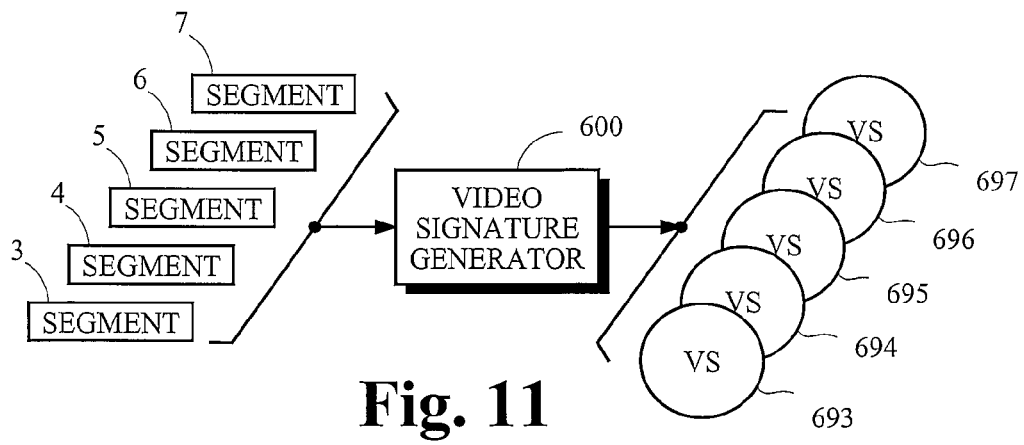
FIG. 11 is a schematic block diagram of a video signature generator processing segments of video content to generate a set of video signatures, according to an embodiment of the present invention.

FIG. 11 is a schematic block diagram showing a set of video signatures 693 to 697 that are generated from the video content of segments 3 to 7, respectively. Referring to FIGS. 10 and 11, the video signature generator 600 obtains the video content of the segment 3 starting at the nominal start time t1 and processes this video content to generate the video signature 693. The video signature generator 600 then obtains the video content of the segment 4 starting at the nominal start time t2 and processes this video content to generate the video signature 694. The generator continues by processing the video content in segments 5, 6 and 7, which begin at nominal start times t3, t4 and t5, respectively, to generate the video signatures 695, 696 and 697. Signatures may be generated for essentially any number of segments that may be desired.

The nominal start times do not need to correspond to any particular time data that may accompany the video content. In principle, the alignment between the nominal start times and the video content is arbitrary. For example, in one implementation the nominal start times are expressed as relative offsets from the beginning of a signal to be processed. Each segment begins with the video frame conveying video content having a start time that is closest to its respective nominal start time. Alternatively, each segment could begin with the video frame that spans the nominal start time for that segment. Essentially any alignment between beginning frame and nominal start time may be used.

Detection of Copies

The signature sets generated from segments of video content can be used to identify the content even when that content has been modified by a variety of processes including those mentioned above. The ability to determine reliably whether specified video content is a copy of a reference content, even when modified, can be used in a variety of ways including the following:

Detection of unauthorized copies: Networks of peer-to-peer servers can facilitate the distribution of content but they can also increase the difficulty of detecting unauthorized or pirated copies of proprietary content because many copies of the content can exist among the peer-to-peer servers. A facility can automatically determine if any unauthorized copies exist in the network by generating signature sets for all content available from the network and checking these signature sets against a data base of reference signature sets.

Confirmation of broadcast: Businesses that contract with broadcast networks to distribute specified video content can confirm the terms of the contract were met by generating signature sets from signals received by a broadcast receiver and comparing these signature sets to reference signature sets for the specified content.

Identification of reception: Businesses that provide ratings for broadcast networks can identify content that is received by a receiver by generating signature sets from the received signals and comparing those signature sets against reference signature sets.

Figure 12:
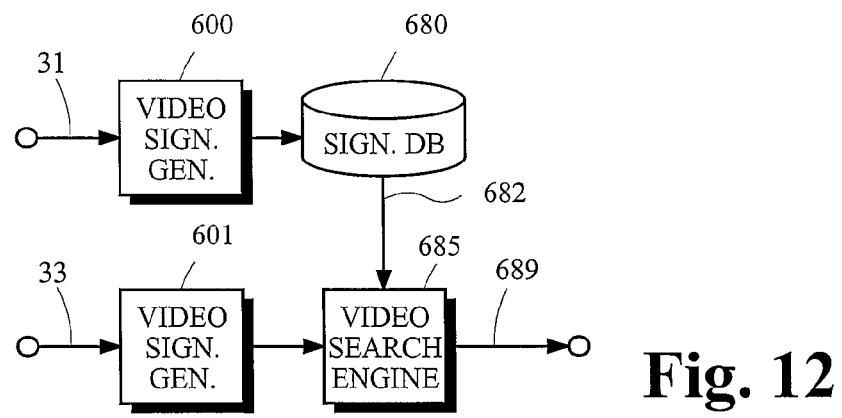
FIG. 12 is a schematic block diagram of a system that manages a signature data base for detection of copies of video content, according to an embodiment of the present invention.

FIG. 12 is a schematic block diagram of a system that may be used to implement a variety of applications such as those mentioned in the preceding list. The video signature generator 600 generates reference video signature sets from reference streams of video content received from the path 31. The generated reference video signature sets are stored in the signature data base 680. The reference signature sets may be stored with other information that may facilitate implementation of the application. For example, the reference signature sets may be stored with the underlying content itself or with information about the content such as the content owner, content licensing terms, title of the content or a textual description of the content. Each reference signature set has a data base search key. This key may be derived in any manner that may be desired. Preferably, the key is based on or derived from the signatures in the associated reference signature set.

Any specified video content may be checked against reference content represented by one or more signature sets stored in the signature data base. The content to be checked is referred to herein as the test content. The identity of the test video content may be checked by having the video signature generator 601 generate one or more test video signature sets from the test video content received from the path 33 and passing the test video signature sets to the video search engine 685. The video search engine 685 attempts to find reference video signature sets in the signature data base 680 that are exact or close matches to the test video signature sets.

In one implementation, the video search engine 685 receives one or more test signature sets from the video signature generator 601. Each test signature set includes an ordered series of test signatures $S_{TEST}$ in the order in which they were generated from the test content. The video search engine 685 receives reference signature sets from the signature data base 680 via the path 682. Each reference signature set includes an ordered series of reference signatures $S_{REF}$ in the order in which they were generated from the corresponding reference content. The video search engine 685 determines the similarity between test content and a particular reference content by calculating a measure of dissimilarity DSM between the test signature set for the test content and the reference signature set for the particular reference content. This measure of dissimilarity DSM is derived from the Hamming distances between corresponding signatures in the series of signatures for the test signature set and the reference signature set for the particular reference content. This measure may be calculated in a number of ways including either of the following expressions:

$$DSM = \sum_{s=1}^{M}(HD[S_{REF}(s), S_{TEST}(s)]) \quad (15a)$$

$$DSM = \sqrt{\sum_{s=1}^{M}(HD[S_{REF}(s), S_{TEST}(s)])^2} \quad (15b)$$

where DSM=the calculated measure of dissimilarity;
HD[x,y]=the Hamming distance between signatures x and y;
$S_{REF}(s)$=the s-th signature in the series of reference signatures; and
$S_{TEST}(s)$=the s-th signature in the series of test signatures.

The video search engine 685 searches the signature data base 680 for the reference signature set that yields the smallest measure of dissimilarity with the test signature set. The reference content associated with this reference signature set is the most likely candidate in the data base to share a common origin with the test content. If the measure of dissimilarity is less than some classification threshold, the test content associated with the test signature set is deemed to share a common origin with or be a copy of the reference content that is associated with the matching reference signature set. Empirical results suggest that good results can be obtained for a variety of video content using if the series of signatures in each signature set represent about two seconds of video content.

For ease of explanation in the following discussion, test content and some specified reference content are said to be "matching" if the test content shares a common origin with the specified reference content.

The value that is chosen for the classification threshold mentioned above affects the likelihood that test and reference content will be correctly recognized as either matching or not matching each other. It also affects the likelihood that an incorrect decision is made. The probability of an "incorrect negative decision" that matching content will be incorrectly classified as content that does not match increases as the value of the classification threshold decreases. Conversely, the probability of an "incorrect positive decision" that non-matching content will be incorrectly classified as content that does match increases as the value of the classification threshold increases.

The classification threshold may be set in any way that may be desired. One method that may be used to set the value of the classification threshold obtains the original video content that is represented by a reference signature set in the data base 680 and creates a number of copies of this original content. The copies are modified in a variety of ways such as by frame-rate conversion and any of the other intentional and unintentional modifications described above. The method generates a test signature set for each copy and calculates a first set of measures of dissimilarity DSM between the test signature sets and the reference signature set. The method also calculates a second set of measures of dissimilarity DSM between the test signature sets and the signature sets for other video content that do not share a common origin with the original content. The range of values in the two sets may not overlap. If they do overlap, the amount of overlap is typically a very small portion of the range of values in each set. The classification threshold is set to a value within the overlap or between the two ranges if they do not overlap. This threshold value may be adjusted according to the needs of the application to balance the risk of incurring either incorrect positive or incorrect negative decisions.

Implementation

Figure 13:
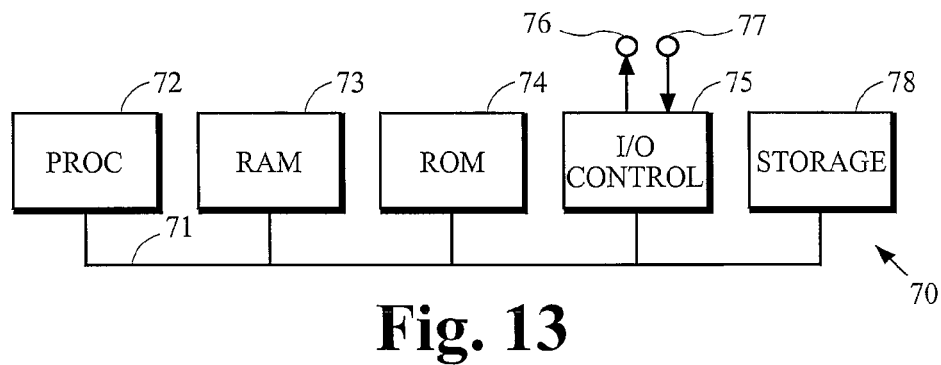
FIG. 13 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 13 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

Examples

In an embodiment, a method comprises or a computer-readable medium carrying one or more sequences of instructions, which instructions, when executed by one or more processors, cause the one or more processors to carry out the steps of: a) for a first representation of a portion of video media content of a temporally related group of content portions in a sequence of video media content, accessing quantized energy values for content elements over a matrix of regions into which the first representation is partitioned; b) estimating a set of basis vectors in a first dimensional space from the quantized energy values; and c) transforming the first representation into a second representation of the video media content portion in a second dimensional space wherein the second representation comprises a projection of the first representation based on the estimated basis vectors; wherein a media fingerprint is derived based, at least in part on the second representation.

In an embodiment, a method or computer-readable medium further comprises wherein the second representation reliably corresponds to the video media content portion over an arbitrary change in a geometric orientation thereof.

In an embodiment, a method or computer-readable medium further comprises wherein the first representation is downsampled to a resolution that is lower than a resolution associated with the video media content portion.

In an embodiment, a method or computer-readable medium further comprises wherein the first representation is cropped from the media content portion.

In an embodiment, a method or computer-readable medium further comprises wherein the first representation of the video media content portion relates to one or more of:

a spatial domain representation that is associated with at least one section of one or more video frames of the sequence; or a transformed representation that is associated with the at least one section of the one or more video frames of the sequence.

In an embodiment, a method or computer-readable medium further comprises wherein the spatial domain representation comprises a coarse characteristic related to spatial resolution associated with the video frames.

In an embodiment, a method or computer-readable medium further comprises wherein the transformed representation is computed from spatially distributed information within the video frames according to a transform function.

In an embodiment, a method or computer-readable medium further comprises wherein the transform function comprises at least one of: a discrete cosine transform; a modified discrete cosine transform; a discrete Fourier transform; a wavelet transform; or a fast Fourier transform.

In an embodiment, a method or computer-readable medium further comprises wherein the video media content portion comprises a first portion of the temporally related group of video content portions, the method further comprising the steps of: repeating steps a) through c) for at least a second video media content portion of the temporally related video content portion group; and d) computing an average value for the second representations of the first content portion and the second content portion over a time period that separates the first content portion and the second content portion within the temporally related portion group.

In an embodiment, a method or computer-readable medium further comprises wherein the average value for the second representations reliably corresponds to the temporally related content portion group over an arbitrary change in a speed of the media content sequence.

In an embodiment, a method or computer-readable medium further comprises further comprising the steps of: e) projecting the average value for the second representations onto a set of random vectors to obtain a set of projection values; f) applying a threshold to the set of projection values; and g) computing a media fingerprint for the temporally related group of content portions.

In an embodiment, a method or computer-readable medium further comprises wherein the media fingerprint reliably corresponds to the temporally related group of content portions over an arbitrary change in the geometric orientation thereof and an arbitrary change in the speed of the media content sequence.

In an embodiment, a method or computer-readable medium further comprises wherein step b) comprises the steps of: computing a singular value decomposition based on the pixel values; wherein the basis vectors are estimated on the basis of the singular value decomposition.

In an embodiment, a method or computer-readable medium further comprises wherein at least a first of the basis vectors is directed along an axis of greatest variance in the pixel values and at least a second of the basis vectors is orthogonal to the first basis vector.

In an embodiment, a method or computer-readable medium further comprises wherein the pixel values comprise a sum of averaged values associated with each of the regions; wherein the values relate to samples of at least one attribute of the media content from the region.

In an embodiment, a method comprises or a computer-readable medium carrying one or more sequences of instructions, which instructions, when executed by one or more processors, cause the one or more processors to carry out the steps of: a) for a first representation of a portion of video media content of a temporally related group of content portions in a sequence of video media content, quantized energy values for content elements over a matrix of regions into which the first representation is partitioned wherein the first representation is downsampled to a lower resolution and cropped from the media content portion; b) estimating a set of basis vectors in a first dimensional space from the quantized energy values; and c) transforming the first representation into a second representation of the video media content portion in a second dimensional space wherein the second representation comprises a projection of the first representation based on the estimated basis vectors; wherein the first representation of the video media content portion relates to one or more of: a spatial domain representation that is associated with at least one section of one or more video frames of the sequence; or a transformed representation that is associated with the at least one section of the one or more video frames of the sequence; and wherein a media fingerprint is derived based, at least in part on the second representation.

In an embodiment, a method or computer-readable medium further comprises wherein the second representation reliably corresponds to the video media content portion over an arbitrary change in a geometric orientation thereof.

In an embodiment, a method or computer-readable medium further comprises wherein the spatial domain representation comprises a coarse characteristic related to spatial resolution associated with the video frames.

In an embodiment, a method or computer-readable medium further comprises wherein the transformed representation is computed from spatially distributed information within the video frames according to a transform function.

In an embodiment, a method or computer-readable medium further comprises wherein the transform function comprises at least one of: a discrete cosine transform; a modified discrete cosine transform; a discrete Fourier transform; a wavelet transform; or a fast Fourier transform.

In an embodiment, a method or computer-readable medium further comprises wherein the video media content portion comprises a first portion of the temporally related group of video content portions, the method further comprising the steps of: repeating steps a) through c) for at least a second video media content portion of the temporally related video content portion group; and d) computing an average value for the second representations of the first content portion and the second content portion over a time period that separates the first content portion and the second content portion within the temporally related portion group.

In an embodiment, a method or computer-readable medium further comprises wherein the average value for the second representations reliably corresponds to the temporally related content portion group over an arbitrary change in a speed of the media content sequence.

In an embodiment, a method or computer-readable medium further comprises e) projecting the average value for the second representations onto a set of random vectors to obtain a set of projection values; f) applying a threshold to the set of projection values; and g) computing a media fingerprint for the temporally related group of content portions.

In an embodiment, a method or computer-readable medium further comprises wherein the media fingerprint reliably corresponds to the temporally related group of content portions over an arbitrary change in the geometric orientation thereof and an arbitrary change in the speed of the media content sequence.

In an embodiment, a method or computer-readable medium further comprises wherein step b) comprises the steps of: computing a singular value decomposition based on the pixel values; wherein the basis vectors are estimated on the basis of the singular value decomposition.

In an embodiment, a method or computer-readable medium further comprises wherein at least a first of the basis vectors is directed along an axis of greatest variance in the pixel values and at least a second of the basis vectors is orthogonal to the first basis vector.

In an embodiment, a method or computer-readable medium further comprises wherein the pixel values comprise a sum of averaged values associated with each of the regions; wherein the values relate to samples of at least one attribute of the media content from the region.

In an embodiment, a system comprises at least one processor; and a computer readable storage medium comprising coded instructions which, when executed with the at least one processor, cause the system to perform at least one step of a method as recited above.

In an embodiment, a system comprises means for performing at least one step of a method as recited above.

In an embodiment, an integrated circuit (IC) device that is configured or programmed to perform steps of one or more of the methods that are recited above, or embody, dispose, or support one or more of the systems as recited above.

In an embodiment, an IC device further comprises wherein the IC comprises at least one of a processor, a programmable logic device, a microcontroller, a field programmable gate array, or an application specific IC.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   a) for a first representation of a portion of video media content of a temporally related group of content portions in a sequence of video media content, accessing quantized energy values for content elements over a matrix of regions into which the first representation is partitioned;
   b) estimating a set of basis vectors in a first dimensional space from the quantized energy values;
   c) transforming the first representation into a second representation of the video media content portion in a second dimensional space wherein the second representation comprises a projection of the first representation based on the estimated basis vectors;
   wherein a media fingerprint is derived based, at least in part on the second representation;
   wherein the video media content portion comprises a first portion of the temporally related group of video content portions;
   repeating steps a) through c) for at least a second video media content portion of the temporally related video content portion group;
   d) computing an average value for the second representations of the first content portion and the second content portion over a time period that separates the first content portion and the second content portion within the temporally related portion group;
   e) projecting the average value for the second representations onto a set of random vectors to obtain a set of projection values;
   f) applying a threshold to the set of projection values; and
   g) computing a media fingerprint for the temporally related group of content portions based on the set of projection values;
   wherein the media fingerprint corresponds to the temporally related group of content portions over an arbitrary change in one or more geometric orientations thereof and an arbitrary change in the speed of the media content sequence.

2. The method as recited in claim 1 wherein the second representation corresponds to the video media content portion over an arbitrary change in a geometric orientation thereof.

3. The method as recited in claim 1 wherein the first representation is downsampled to a resolution that is lower than a resolution associated with the video media content portion.

4. The method as recited in claim 1 wherein the first representation is cropped from the media content portion.

5. The method as recited in claim 1 wherein the first representation of the video media content portion relates to one or more of:
   a spatial domain representation that is associated with at least one section of one or more video frames of the sequence; or
   a transformed representation that is associated with the at least one section of the one or more video frames of the sequence.

6. The method as recited in claim 5 wherein the spatial domain representation comprises a coarse characteristic related to spatial resolution associated with the video frames.

7. The method as recited in claim 5 wherein the transformed representation is computed from spatially distributed information within the video frames according to a transform function.

8. The method as recited in claim 5 wherein the transform function comprises at least one of:
   a discrete cosine transform;
   a modified discrete cosine transform;
   a discrete Fourier transform;
   a wavelet transform; or
   a fast Fourier transform.

9. The method as recited in claim 1 wherein the average value for the second representations corresponds to the temporally related content portion group over an arbitrary change in a speed of the media content sequence.

10. The method as recited in claim 1 wherein step b) comprises the steps of:
    computing a singular value decomposition based on the pixel values;
    wherein the basis vectors are estimated on the basis of the singular value decomposition.

11. The method as recited in claim 10 wherein at least a first of the basis vectors is directed along an axis of greatest variance in the pixel values and at least a second of the basis vectors is orthogonal to the first basis vector.

12. The method as recited in claim 1 wherein the pixel values comprise a sum of averaged values associated with each of the regions; wherein the values relate to samples of at least one attribute of the media content from the region.

13. The method as recited in claim 1, wherein the video media content portion comprises a temporal window in the video media content, in relation to at least one subsequent video media content portion, of the temporally related group of content portions; and
    wherein the method further comprises:
    repeating the steps a) through c) for the video media content sequence; and
    applying a transform function over a temporal window, with which an early portion and the subsequent portion of the video media content are related in time;
    wherein the step of applying the transform function describes a change in an image feature of the video content over the temporal window.

14. A method, comprising:
    a) for a first representation of a portion of video media content of a temporally related group of content portions in a sequence of video media content, accessing quantized energy values for content elements over a matrix of regions into which the first representation is partitioned wherein the first representation is downsampled to a lower resolution and cropped from the media content portion;

b) estimating a set of basis vectors in a first dimensional space from the quantized energy values; and c) transforming the first representation into a second representation of the video media content portion in a second dimensional space wherein the second representation comprises a projection of the first representation based on the estimated basis vectors;

wherein the first representation of the video media content portion relates to one or more of:
   a spatial domain representation that is associated with at least one section of one or more video frames of the sequence; or
   a transformed representation that is associated with the at least one section of the one or more video frames of the sequence;

wherein a media fingerprint is derived based, at least in part on the second representation;

wherein the video media content portion comprises a first portion of the temporally related group of video content portions;

repeating steps a) through c) for at least a second video media content portion of the temporally related video content portion group;

d) computing an average value for the second representations of the first content portion and the second content portion over a time period that separates the first content portion and the second content portion within the temporally related portion group;

e) projecting the average value for the second representations onto a set of random vectors to obtain a set of projection values;

f) applying a threshold to the set of projection values; and g) computing a media fingerprint for the temporally related group of content portions;

wherein the media fingerprint corresponds to the temporally related group of content portions over an arbitrary change in the geometric orientation thereof and an arbitrary change in the speed of the media content sequence.

15. The method as recited in claim 14 wherein the second representation corresponds to the video media content portion over an arbitrary change in a geometric orientation thereof.

16. The method as recited in claim 14 wherein the spatial domain representation comprises a coarse characteristic related to spatial resolution associated with the video frames.

17. The method as recited in claim 14 wherein the transformed representation is computed from spatially distributed information within the video frames according to a transform function.

18. The method as recited in claim 17 wherein the transform function comprises at least one of:
   a discrete cosine transform;
   a modified discrete cosine transform;
   a discrete Fourier transform;
   a wavelet transform; or
   a fast Fourier transform.

19. The method as recited in claim 18 wherein the average value for the second representations corresponds to the temporally related content portion group over an arbitrary change in a speed of the media content sequence.

20. The method as recited in claim 14 wherein step b) comprises:
   computing a singular value decomposition based on the pixel values;
   wherein the basis vectors are estimated on the basis of the singular value decomposition.

21. The method as recited in claim 20 wherein at least a first of the basis vectors is directed along an axis of greatest variance in the pixel values and at least a second of the basis vectors is orthogonal to the first basis vector.

22. The method as recited in claim 14 wherein the pixel values comprise a sum of averaged values associated with each of the regions; wherein the values relate to samples of at least one attribute of the media content from the region.

23. The method as recited in claim 22, wherein the temporal window comprises a temporally early portion of the video media content.

24. A non-transitory computer readable storage medium comprising encoded instructions which, when executed with one or more processors, cause the one or more processors to perform the steps of:

a) for a first representation of a portion of video media content of a temporally related group of content portions in a sequence of video media content, accessing quantized energy values for content elements over a matrix of regions into which the first representation is partitioned;

b) estimating a set of basis vectors in a first dimensional space from the quantized energy values;

c) transforming the first representation into a second representation of the video media content portion in a second dimensional space wherein the second representation comprises a projection of the first representation based on the estimated basis vectors;

wherein a media fingerprint is derived based, at least in part on the second representation;

wherein the video media content portion comprises a first portion of the temporally related group of video content portions;

repeating steps a) through c) for at least a second video media content portion of the temporally related video content portion group;

d) computing an average value for the second representations of the first content portion and the second content portion over a time period that separates the first content portion and the second content portion within the temporally related portion group;

e) projecting the average value for the second representations onto a set of random vectors to obtain a set of projection values;

f) applying a threshold to the set of projection values; and g) computing a media fingerprint for the temporally related group of content portions based on the set of projection values;

wherein the media fingerprint corresponds to the temporally related group of content portions over an arbitrary change in one or more geometric orientations thereof and an arbitrary change in the speed of the media content sequence.

25. The method as recited in claim 24 wherein the second representation corresponds to the video media content portion over an arbitrary change in a geometric orientation thereof.

26. The method as recited in claim 24 wherein the first representation is downsampled to a resolution that is lower than a resolution associated with the video media content portion.

27. The non-transitory computer readable storage medium as recited in claim 24 wherein the first representation is cropped from the media content portion.

28. The non-transitory computer readable storage medium as recited in claim 24 wherein the first representation of the video media content portion relates to one or more of:
   a spatial domain representation that is associated with at least one section of one or more video frames of the sequence; or
   a transformed representation that is associated with the at least one section of the one or more video frames of the sequence.

29. The non-transitory computer readable storage medium as recited in claim 28 wherein the spatial domain representation comprises a coarse characteristic related to spatial resolution associated with the video frames.

30. The non-transitory computer readable storage medium as recited in claim 28 wherein the transformed representation is computed from spatially distributed information within the video frames according to a transform function.

31. The non-transitory computer readable storage medium as recited in claim 28 wherein the transform function comprises at least one of:
   a discrete cosine transform;
   a modified discrete cosine transform;
   a discrete Fourier transform;
   a wavelet transform; or
   a fast Fourier transform.

32. The non-transitory computer readable storage medium as recited in claim 24 wherein the average value for the second representations corresponds to the temporally related content portion group over an arbitrary change in a speed of the media content sequence.

33. The non-transitory computer readable storage medium as recited in claim 24 wherein step b) comprises the steps of:
   computing a singular value decomposition based on the pixel values;
   wherein the basis vectors are estimated on the basis of the singular value decomposition.

34. The non-transitory computer readable storage medium as recited in claim 33 wherein at least a first of the basis vectors is directed along an axis of greatest variance in the pixel values and at least a second of the basis vectors is orthogonal to the first basis vector.

35. The non-transitory computer readable storage medium as recited in claim 24 wherein the pixel values comprise a sum of averaged values associated with each of the regions; wherein the values relate to samples of at least one attribute of the media content from the region.

36. The non-transitory computer readable storage medium as recited in claim 24, wherein the video media content portion comprises a temporal window in the video media content, in relation to at least one subsequent video media content portion, of the temporally related group of content portions; and
   wherein the method further comprises the steps of:
   repeating the steps a) through c) for the video media content sequence; and
   applying a transform function over a temporal window, with which an early portion and the subsequent portion of the video media content are related in time;
   wherein the step of applying the transform function describes a change in an image feature of the video content over the temporal window.

37. The non-transitory computer readable storage medium as recited in claim 36, wherein the temporal window comprises a temporally early portion of the video media content.

38. A non-transitory computer readable storage medium comprising encoded instructions which, when executed with one or more processors, cause the one or more processors to perform the steps of:
   a) for a first representation of a portion of video media content of a temporally related group of content portions in a sequence of video media content, accessing quantized energy values for content elements over a matrix of regions into which the first representation is partitioned wherein the first representation is downsampled to a lower resolution and cropped from the media content portion;
   b) estimating a set of basis vectors in a first dimensional space from the quantized energy values; and
   c) transforming the first representation into a second representation of the video media content portion in a second dimensional space wherein the second representation comprises a projection of the first representation based on the estimated basis vectors;
   wherein the first representation of the video media content portion relates to one or more of:
      a spatial domain representation that is associated with at least one section of one or more video frames of the sequence; or
      a transformed representation that is associated with the at least one section of the one or more video frames of the sequence;
   wherein a media fingerprint is derived based, at least in part on the second representation;
   wherein the video media content portion comprises a first portion of the temporally related group of video content portions;
   repeating steps a) through c) for at least a second video media content portion of the temporally related video content portion group;
   d) computing an average value for the second representations of the first content portion and the second content portion over a time period that separates the first content portion and the second content portion within the temporally related portion group;
   e) projecting the average value for the second representations onto a set of random vectors to obtain a set of projection values;
   f) applying a threshold to the set of projection values; and
   g) computing a media fingerprint for the temporally related group of content portions.
   wherein the media fingerprint corresponds to the temporally related group of content portions over an arbitrary change in the geometric orientation thereof and an arbitrary change in the speed of the media content sequence.

39. The non-transitory computer readable storage medium as recited in claim 38 wherein the second representation corresponds to the video media content portion over an arbitrary change in a geometric orientation thereof.

40. The non-transitory computer readable storage medium as recited in claim 38 wherein the spatial domain representation comprises a coarse characteristic related to spatial resolution associated with the video frames.

41. The non-transitory computer readable storage medium as recited in claim 38 wherein the transformed representation is computed from spatially distributed information within the video frames according to a transform function.

42. The non-transitory computer readable storage medium as recited in claim 41 wherein the transform function comprises at least one of:
   a discrete cosine transform;
   a modified discrete cosine transform;
   a discrete Fourier transform;
   a wavelet transform; or
   a fast Fourier transform.

43. The non-transitory computer readable storage medium as recited in claim 42 wherein the average value for the second representations corresponds to the temporally related content portion group over an arbitrary change in a speed of the media content sequence.

44. The non-transitory computer readable storage medium as recited in claim 38 wherein step b) comprises the steps of:
   computing a singular value decomposition based on the pixel values;
   wherein the basis vectors are estimated on the basis of the singular value decomposition.

45. The non-transitory computer readable storage medium as recited in claim 44 wherein at least a first of the basis vectors is directed along an axis of greatest variance in the pixel values and at least a second of the basis vectors is orthogonal to the first basis vector.

46. The non-transitory computer readable storage medium as recited in claim 38 wherein the pixel values comprise a sum of averaged values associated with each of the regions; wherein the values relate to samples of at least one attribute of the media content from the region.

47. An apparatus, comprising the steps of:
   a) a subsystem that, for a first representation of a portion of video media content of a temporally related group of content portions in a sequence of video media content, accesses quantized energy values for content elements over a matrix of regions into which the first representation is partitioned;
   b) a subsystem that estimates a set of basis vectors in a first dimensional space from the quantized energy values;
   c) a subsystem that transforms the first representation into a second representation of the video media content portion in a second dimensional space wherein the second representation comprises a projection of the first representation based on the estimated basis vectors;
   wherein a media fingerprint is derived based, at least in part on the second representation;
   wherein the video media content portion comprises a first portion of the temporally related group of video content portions;
   a subsystem that repeats a) through c) for at least a second video media content portion of the temporally related video content portion group;
   d) a subsystem that computes an average value for the second representations of the first content portion and the second content portion over a time period that separates the first content portion and the second content portion within the temporally related portion group;
   e) a subsystem that projects the average value for the second representations onto a set of random vectors to obtain a set of projection values;
   f) a subsystem that applies a threshold to the set of projection values; and
   g) a subsystem that computes a media fingerprint for the temporally related group of content portions based on the set of projection values;
   wherein the media fingerprint corresponds to the temporally related group of content portions over an arbitrary change in one or more geometric orientations thereof and an arbitrary change in the speed of the media content sequence.

48. The apparatus as recited in claim 47 wherein the second representation corresponds to the video media content portion over an arbitrary change in a geometric orientation thereof.

49. The apparatus as recited in claim 47 wherein the first representation is downsampled to a resolution that is lower than a resolution associated with the video media content portion.

50. The apparatus as recited in claim 47 wherein the first representation is cropped from the media content portion.

51. The apparatus as recited in claim 47 wherein the first representation of the video media content portion relates to one or more of:
   a spatial domain representation that is associated with at least one section of one or more video frames of the sequence; or
   a transformed representation that is associated with the at least one section of the one or more video frames of the sequence.

52. The apparatus as recited in claim 51 wherein the spatial domain representation comprises a coarse characteristic related to spatial resolution associated with the video frames.

53. The apparatus as recited in claim 51 wherein the transformed representation is computed from spatially distributed information within the video frames according to a transform function.

54. The apparatus as recited in claim 51 wherein the transform function comprises at least one of:
   a discrete cosine transform;
   a modified discrete cosine transform;
   a discrete Fourier transform;
   a wavelet transform; or
   a fast Fourier transform.

55. The apparatus as recited in claim 47 wherein the average value for the second representations corresponds to the temporally related content portion group over an arbitrary change in a speed of the media content sequence.

56. The apparatus as recited in claim 47 wherein subsystem b) further comprises:
   a subsystem that computes a singular value decomposition based on the pixel values;
   wherein the basis vectors are estimated on the basis of the singular value decomposition.

57. The apparatus as recited in claim 56 wherein at least a first of the basis vectors is directed along an axis of greatest variance in the pixel values and at least a second of the basis vectors is orthogonal to the first basis vector.

58. The apparatus as recited in claim 47 wherein the pixel values comprise a sum of averaged values associated with each of the regions; wherein the values relate to samples of at least one attribute of the media content from the region.

59. The apparatus as recited in claim 47, wherein the video media content portion comprises a temporal window in the video media content, in relation to at least one subsequent video media content portion, of the temporally related group of content portions; and
   wherein the apparatus further comprises the steps of:
      repeating the steps a) through c) for the video media content sequence; and applying a transform function over a temporal window, with which an early portion and the subsequent portion of the video media content are related in time;

wherein the step of applying the transform function describes a change in an image feature of the video content over the temporal window.

60. The apparatus as recited in claim 59, wherein the temporal window comprises a temporally early portion of the video media content.

61. An apparatus, comprising:
   a) a subsystem that, for a first representation of a portion of video media content of a temporally related group of content portions in a sequence of video media content, accesses quantized energy values for content elements over a matrix of regions into which the first representation is partitioned wherein the first representation is downsampled to a lower resolution and cropped from the media content portion;
   b) a subsystem that estimates a set of basis vectors in a first dimensional space from the quantized energy values; and
   c) a subsystem that transforms the first representation into a second representation of the video media content portion in a second dimensional space wherein the second representation comprises a projection of the first representation based on the estimated basis vectors;
   wherein the first representation of the video media content portion relates to one or more of:
      a spatial domain representation that is associated with at least one section of one or more video frames of the sequence; or
      a transformed representation that is associated with the at least one section of the one or more video frames of the sequence;
   wherein a media fingerprint is derived based, at least in part on the second representation;
   wherein the video media content portion comprises a first portion of the temporally related group of video content portions;
   a subsystem that repeats a) through c) for at least a second video media content portion of the temporally related video content portion group;
   d) a subsystem that computes an average value for the second representations of the first content portion and the second content portion over a time period that separates the first content portion and the second content portion within the temporally related portion group;
   e) a subsystem that projects the average value for the second representations onto a set of random vectors to obtain a set of projection values;
   f) a subsystem that applies a threshold to the set of projection values; and
   g) c a subsystem that computes a media fingerprint for the temporally related group of content portions.
   wherein the media fingerprint corresponds to the temporally related group of content portions over an arbitrary change in the geometric orientation thereof and an arbitrary change in the speed of the media content sequence.

62. The apparatus as recited in claim 61 wherein the second representation corresponds to the video media content portion over an arbitrary change in a geometric orientation thereof.

63. The apparatus as recited in claim 61 wherein the spatial domain representation comprises a coarse characteristic related to spatial resolution associated with the video frames.

64. The apparatus as recited in claim 61 wherein the transformed representation is computed from spatially distributed information within the video frames according to a transform function.

65. The apparatus as recited in claim 64 wherein the transform function comprises at least one of:
   a discrete cosine transform;
   a modified discrete cosine transform;
   a discrete Fourier transform;
   a wavelet transform; or
   a fast Fourier transform.

66. The apparatus as recited in claim 65 wherein the average value for the second representations corresponds to the temporally related content portion group over an arbitrary change in a speed of the media content sequence.

67. The apparatus as recited in claim 61 wherein subsystem b) further comprises:
   a subsystem that computes a singular value decomposition based on the pixel values;
   wherein the basis vectors are estimated on the basis of the singular value decomposition.

68. The apparatus as recited in claim 67 wherein at least a first of the basis vectors is directed along an axis of greatest variance in the pixel values and at least a second of the basis vectors is orthogonal to the first basis vector.

69. The apparatus as recited in claim 61 wherein the pixel values comprise a sum of averaged values associated with each of the regions; wherein the values relate to samples of at least one attribute of the media content from the region.

\* \* \* \* \*